(12) United States Patent
Rissler

(10) Patent No.: US 12,420,405 B1
(45) Date of Patent: Sep. 23, 2025

(54) RESILIENT AND DYNAMIC MEMBER SYSTEMS

(71) Applicant: Matthew Ivan Rissler, Palmyra, PA (US)

(72) Inventor: Matthew Ivan Rissler, Palmyra, PA (US)

(73) Assignee: LeTourneau University, Longview, TX (US)

( * ) Notice: Subject to any disclaimer, the term of this patent is extended or adjusted under 35 U.S.C. 154(b) by 1035 days.

(21) Appl. No.: 17/175,400

(22) Filed: Feb. 12, 2021

(51) Int. Cl.
| | |
|---|---|
| *E04B 1/19* | (2006.01) |
| *B25J 9/00* | (2006.01) |
| *B25J 9/08* | (2006.01) |
| *B25J 9/10* | (2006.01) |
| *B25J 13/08* | (2006.01) |
| *B25J 18/06* | (2006.01) |
| *B25J 19/00* | (2006.01) |
| *B64G 99/00* | (2009.01) |

(52) U.S. Cl.
CPC .............. *B25J 9/08* (2013.01); *B25J 9/0015* (2013.01); *B25J 9/104* (2013.01); *B25J 13/088* (2013.01); *B25J 18/06* (2013.01); *B25J 19/0029* (2013.01); *B64G 99/00* (2022.08); *E04B 1/19* (2013.01); *Y10T 403/342* (2015.01); *Y10T 403/347* (2015.01)

(58) Field of Classification Search
CPC ... B25J 9/08; B25J 9/0015; B25J 9/104; B25J 13/088; B25J 8/06; B25J 19/0029; B64G 99/00; E04B 1/19; E04B 1/1903; Y10T 403/342; Y10T 403/347
See application file for complete search history.

(56) References Cited

U.S. PATENT DOCUMENTS

| | | | | |
|---|---|---|---|---|
| 5,088,852 | A * | 2/1992 | Davister | F16B 7/044 403/171 |
| 5,318,470 | A * | 6/1994 | Denny | A63H 33/10 52/655.2 |
| 5,433,549 | A * | 7/1995 | McGaffigan | A63H 33/042 403/41 |
| 5,542,871 | A * | 8/1996 | Gabriel | A63H 33/101 24/615 |
| 5,640,811 | A * | 6/1997 | Boyle | E04H 4/108 52/86 |
| 6,378,265 | B1 * | 4/2002 | Konstandt | E04B 1/1903 403/171 |
| 6,869,246 | B2 * | 3/2005 | Bridgers | G09B 25/00 52/81.3 |
| 9,731,773 | B2 * | 8/2017 | Gami | B62D 27/02 |
| 10,260,227 | B2 * | 4/2019 | Corbett | F16B 7/185 |
| 10,774,518 | B1 * | 9/2020 | Eller | E04B 1/1906 |
| 10,788,107 | B2 * | 9/2020 | Jang | F16H 19/06 |
| 10,905,967 | B1 * | 2/2021 | Satok-Wolman | A44C 13/00 |
| 10,937,335 | B2 * | 3/2021 | Sequeira De Oliveira | G09B 23/10 |
| 10,968,930 | B2 * | 4/2021 | Lan | F16B 5/02 |

(Continued)

*Primary Examiner* — Thomas W Irvin
(74) *Attorney, Agent, or Firm* — Gary DeBoer; Greg Parker

(57) ABSTRACT

Resilient and dynamic member systems are described. In some embodiments, a system may include a central node and a plurality of connector elements. The connector elements may include first and second end portions configured to be coupled to the central node. The connector elements may further include resilient portions between the first and second end portions.

21 Claims, 23 Drawing Sheets

(56) References Cited

U.S. PATENT DOCUMENTS

| | | | |
|---|---|---|---|
| 11,359,364 B1* | 6/2022 | Eller | H01Q 15/161 |
| 2001/0000717 A1* | 5/2001 | Bridgers | F16B 7/048 |
| | | | 403/169 |
| 2006/0053729 A1* | 3/2006 | Wallner | B27G 15/00 |
| | | | 52/655.1 |
| 2017/0081837 A1* | 3/2017 | Bell | E04B 1/19 |
| 2017/0305471 A1* | 10/2017 | Gami | B62D 65/02 |
| 2019/0284792 A1* | 9/2019 | López Blanco | E04B 1/1903 |
| 2021/0196012 A1* | 7/2021 | Satok-Wolman | A44C 13/00 |
| 2021/0259372 A1* | 8/2021 | Satok-Wolman | E04B 1/3483 |

* cited by examiner

RESILIENT AND DYNAMIC MEMBER SYSTEMS

FIELD

The present disclosure relates to resilient and dynamic member systems.

BACKGROUND

There is a need for systems that can be easily assembled to form resilient and dynamic structures. For example, components used for building structures in space should ideally be usable by robots or automated mechanical systems. The components should also provide strength and flexibility to the structures they are used to create.

Resilient and dynamic member system can include alternating rigid and resilient members. The alternation of rigid and resilient members provides a composite system, which is both flexible and provides support for certain configurations. As described herein, exemplary resilient and dynamic member systems can be used as models and toy systems, electronic systems, clasp systems, robotic systems, medical devices, space systems, and any other devices, systems, or instruments which require multiple configurations.

SUMMARY

The various examples of the present disclosure are directed towards a novel and improved resilient and dynamic member system. In one exemplary embodiment, a system includes a central node and a plurality of hollow resilient members. The central node includes a top portion, a bottom portion configured to removably couple with the top portion, and a plurality of holding portions. End portions of each hollow resilient member are configured to be received by one of the plurality of holding portions.

In another exemplary embodiment, a system includes: (1) a central node comprising a plurality of holding portions; (2) a plurality of connector elements, wherein each connector element comprises: (a) a first solid end portion configured to removably couple with one of the plurality of holding portions; (b) a second solid end portion configured to removably couple one of the plurality of holding portions; and (c) a resilient portion comprising a helical spring between the first solid end portion and the second solid end portion.

In another exemplary embodiment, the present disclosure provides a modular system, including (1) a central node comprising at least one holding portion; (2) a plurality of connector elements extending from the central node and (3) a plurality of cables affixed along an exterior of each of the plurality of connector elements. Each connector element includes a first end portion affixed to the central node; a second end portion configured to couple with a second end portion of another modular system; and a resilient portion comprising a helical spring between the first solid end portion and the second solid end portion.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims.

BRIEF DESCRIPTION OF THE DRAWINGS

The accompanying drawings exemplify the embodiments of the present invention and, together with the description, serve to explain and illustrate principles of the invention. The drawings are intended to illustrate major features of the exemplary embodiments in a diagrammatic manner. The drawings are not intended to depict every feature of actual embodiments nor relative dimensions of the depicted elements, and are not drawn to scale.

DETAILED DESCRIPTION

Figure 1A:
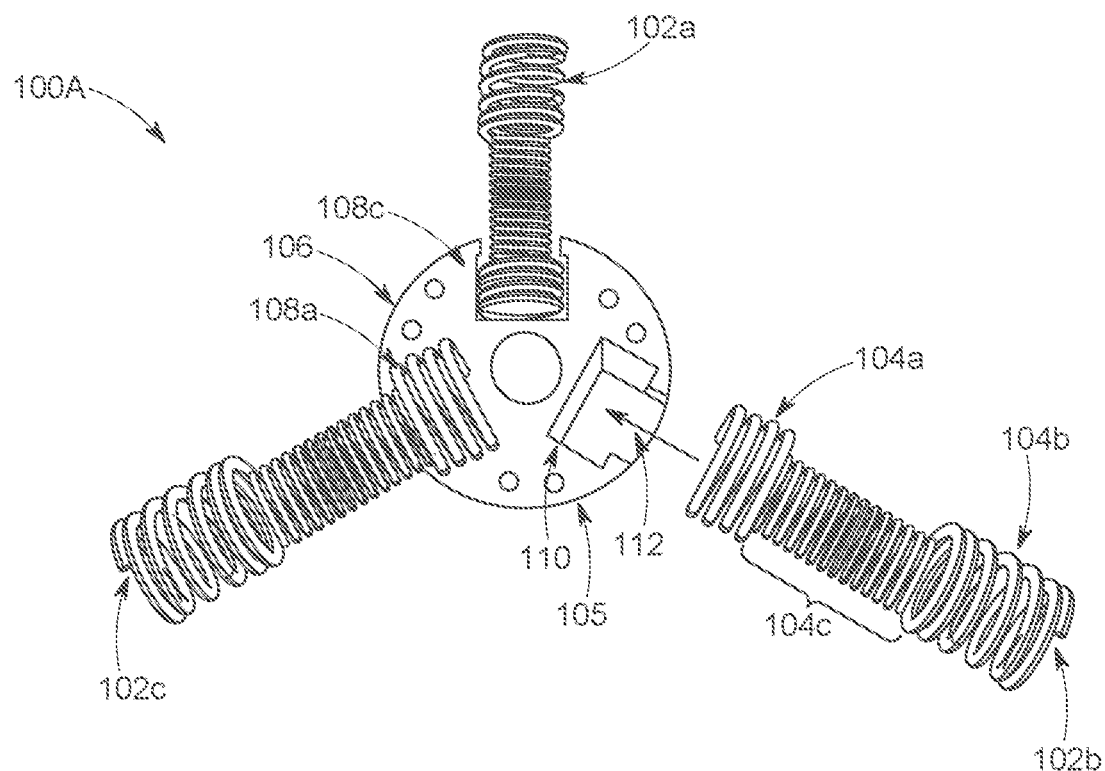
FIG. 1A shows an exemplary system with a central node and a plurality of resilient members, according to an embodiment of the present disclosure.

The present invention is described with reference to the attached figures, where like reference numerals are used throughout the figures to designate similar or equivalent elements. The figures are not drawn to scale, and are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details, or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

The present disclosure provides resilient and dynamic systems which can be easily modified by a user to provide multi-functionality, ease of use, and integration with other systems.

FIG. 1A shows an exemplary system 100A, according to an embodiment of the present disclosure. System 100A may include a central node 106 and a plurality of resilient members 102a, 102b, and 102c.

Central node 106 may provide a plurality of holding portions 108a, 108b, and 108c, which may each be configured to receive one of the resilient members 102a, 102b, and 102c. Although three holding portions 108a, 108b, and 108c are shown, the present disclosure contemplates than an exemplary central node 106 can have more or fewer holding portions. Additionally, each of the resilient members 102a, 102b, and 102c can be received by any of the holding portions 108a, 108b, and 108c. As discussed in further detail below and shown with respect to resilient member 102b, each resilient member 102a, 102b, and 102c may include end portions 104a and 104b and a center portion 104c. In some examples, as shown in FIGS. 1C-1D, a central node may formed of two components, which may be of substantially identical shape so that end portions 104a of resilient members 102a, 102b, and 102c are completely enclosed. For example, the two components may engage one another as a snap-fit to form a central node 106 which may be coupled to the resilient members 102a, 102b, and 102c by its holding portions 108a, 108b, 108c.

Turning now to holding portion 108b, each holding portion 108a, 108b, and 108c includes a top portion 110 and a bottom portion 112. The top portion 110 has a larger width than the bottom portion 112, and is configured to receive either end portion 104a or 104b of a resilient member 102a, 102b, or 102c. For example, the width of the top portion 110 corresponds to a diameter of end portions 104a and 104b, allowing a snap-fit of a resilient member 102a, 102b, or 102c into holding portion 108a, 108b, or 108c. The bottom portion 112 extends from the top portion 110 to an exterior perimeter 105 of the central node 106. For example, the bottom portion 112 has a width corresponding to a diameter of a center portion 104c of a resilient member 102a, 102b, or 102c.

In some examples, resilient members 102a, 102b, and 102c are hollow, helical compression springs in an hourglass-type shape where end portions 104a and 104b have wider diameters than a center portion 104c (as shown in FIG. 1A). In some examples, resilient members 102a, 102b, and 102c are made of any flexible material, including, but not limited to, plastic, metal, and rubber. In some examples, resilient members 102a, 102b, and 102c are cylindrically shaped (as shown in FIG. 1A). In other examples, resilient members 102a, 102b, and 102c may be any geometric shape. In preferred embodiments, end portions 104a and 104b are wider than central portions 104c. Resilient members 102a, 102b, and 102c are further symmetrical along a horizontal axis and a vertical axis, allowing for ease of coupling with a central node 106.

Figure 1B:
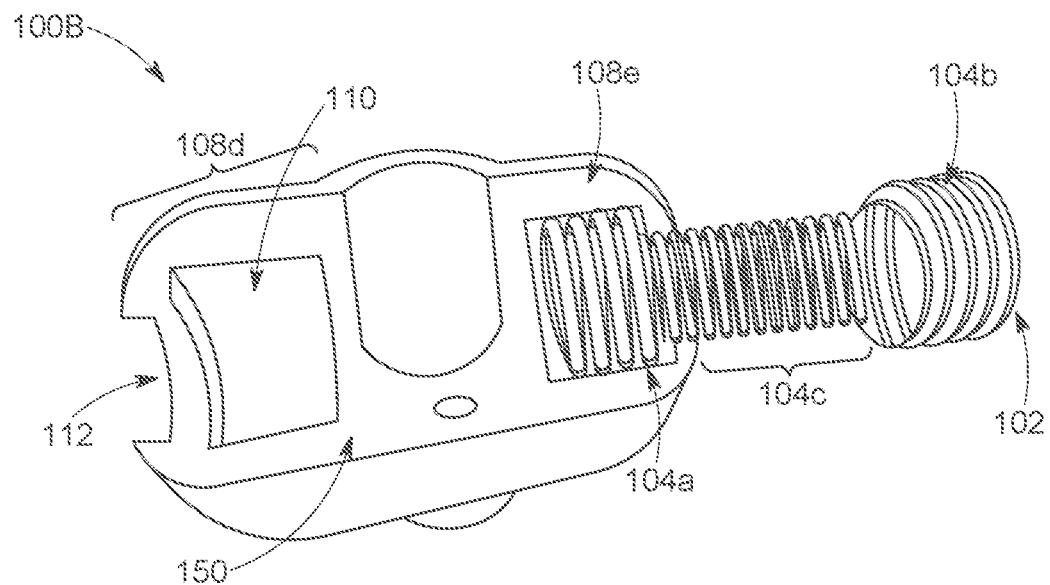
FIG. 1B shows an exemplary coupled node and resilient member, according to an embodiment of the present disclosure.
Figure 1C:
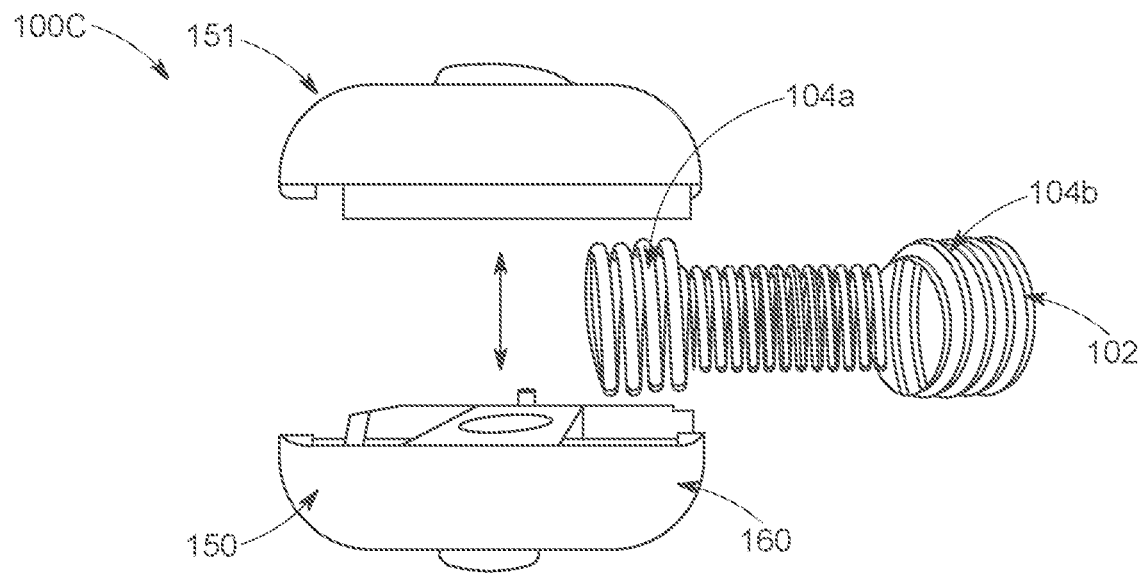
FIG. 1C shows an exploded view of an exemplary system, according to an embodiment of the present disclosure.
Figure 1D:
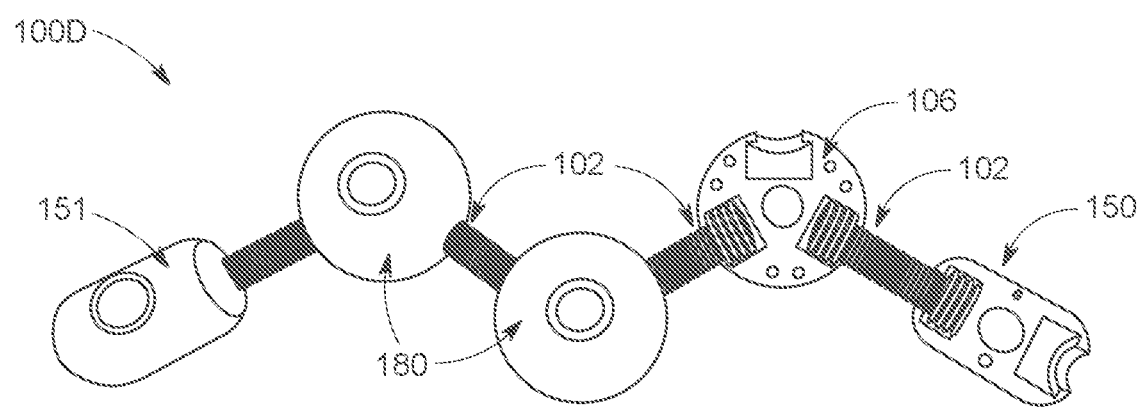
FIG. 1D shows an exemplary system, according to an embodiment of the present disclosure.

FIG. 1B shows an exemplary system 100B, according to an embodiment of the present disclosure. System 100B includes many components and similar labels to components in FIG. 1A. In addition, system 100B includes a central node 150. Central node 150 provides only two holding portions 108c and 108d. Holding portions 108c and 108d correspond to holding portions 108a, 108b, and 108c as discussed above regarding FIG. 1A and are configured to receive a resilient member 102. Resilient member 102 corresponds to resilient members 102a, 102b, and 102c, as discussed above regarding FIG. 1A. Therefore, FIG. 1B shows a central node 150 which can replace central node 106 of FIG. 1A, or be used as a connector element in combination with central node 106 of FIG. 1A.

FIG. 1C shows an exploded side view of an exemplary system 100C, according to an embodiment of the present disclosure. System 100C includes many components and similar labels to components in FIG. 1B. In addition, system 100C includes a second central node 151. FIG. 1C shows that a shape of central node 151 corresponds to the shape of central node 150, and, therefore, central node 151 can achieve a snap fit with central node 150 while resilient member 102 is received within holding portions on each central node 150 and 151. For example, the holding portions have a depth 160 corresponding to a radius of the end portions 104a and 104b of a resilient member 102.

FIG. 1D shows an exemplary system 100D, according to an embodiment of the present disclosure. System 100D includes many components and similar labels to components in FIGS. 1A-1C. In addition, system 100D includes third central nodes 180. Third central nodes 180 correspond to the shape of central node 106 and, therefore, central node 180 can achieve a snap fit with central node 106 while a resilient member 102 is received within holding portions on each central node 180 and 106. FIG. 1D further demonstrates how components of FIGS. 1A-1C can be assembled in various configurations (one exemplary configuration is shown in FIG. 1D) to achieve various functionality and shapes as desired by a user.

Figure 2A:
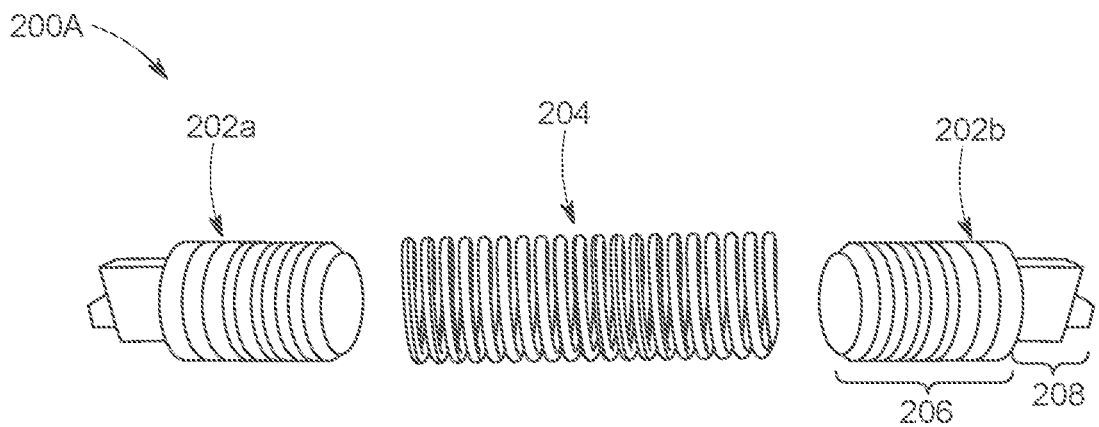
FIG. 2A shows an exploded view of an exemplary system, according to an embodiment of the present disclosure.

FIG. 2A shows an exploded view of an exemplary system 200A, according to an embodiment of the present disclosure. System 200A includes connector elements 202a and 202b, and a resilient member 204. For example, resilient member 204 is a hollow, cylindrical compression spring. Other examples of shapes and composition of connector elements 202a and 202b each have a threaded portions 206 and an end portion 208. The threaded portion is configured to screw into an interior of the resilient member 204, such that spring coils of the resilient member 204 correspond to grooves of the threaded portion 206. The end portions 208 may be an x-shape or a cross shape.

Figure 2B:
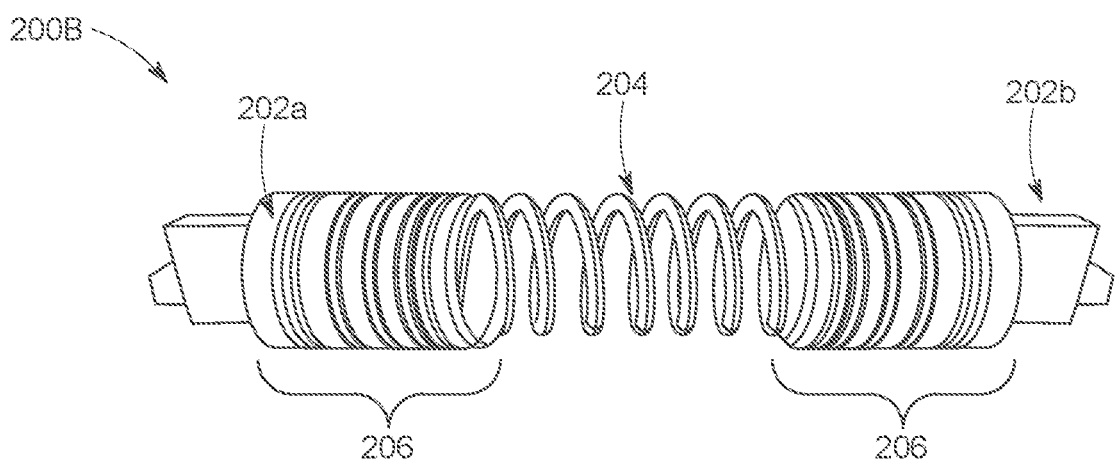
FIG. 2B shows a coupled configuration of the components of FIG. 2A, according to an embodiment of the present disclosure.

FIG. 2B shows a coupled configuration 200B of the components of FIG. 2A, according to an embodiment of the present disclosure. As shown, the threaded portions 206 of connector elements 202a and 202b screw into a hollow, interior portion of the resilient member 204.

Figure 2C:
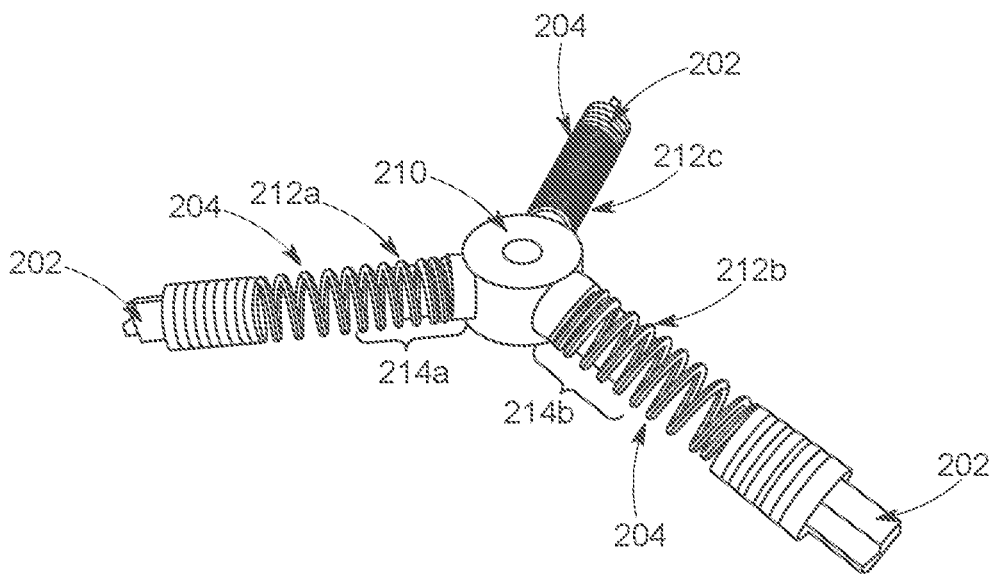
FIG. 2C shows an exemplary system, according to an embodiment of the present disclosure.

FIG. 2C shows an exemplary system 200C, according to an embodiment of the present disclosure. System 200C includes many components and similar labels to components in FIGS. 2A-2B. In addition, system 200C includes fourth central nodes 210. Central nodes 210 include a plurality of arms 212a, 212b, and 212c. Although three arms 212a, 212b, and 212c are shown, an exemplary central node 210 can include more or fewer arms. Each arm 212a, 212b, and 212c has a corresponding threaded portion 214 (shown as 214a and 214b for arm 212a and 212b, respectively). The threaded portions 214 correspond to threaded portions 206 of connector elements 202. For example, grooves along the threaded portions 214 receive spring coils of the resilient members 202.

Figure 2D:
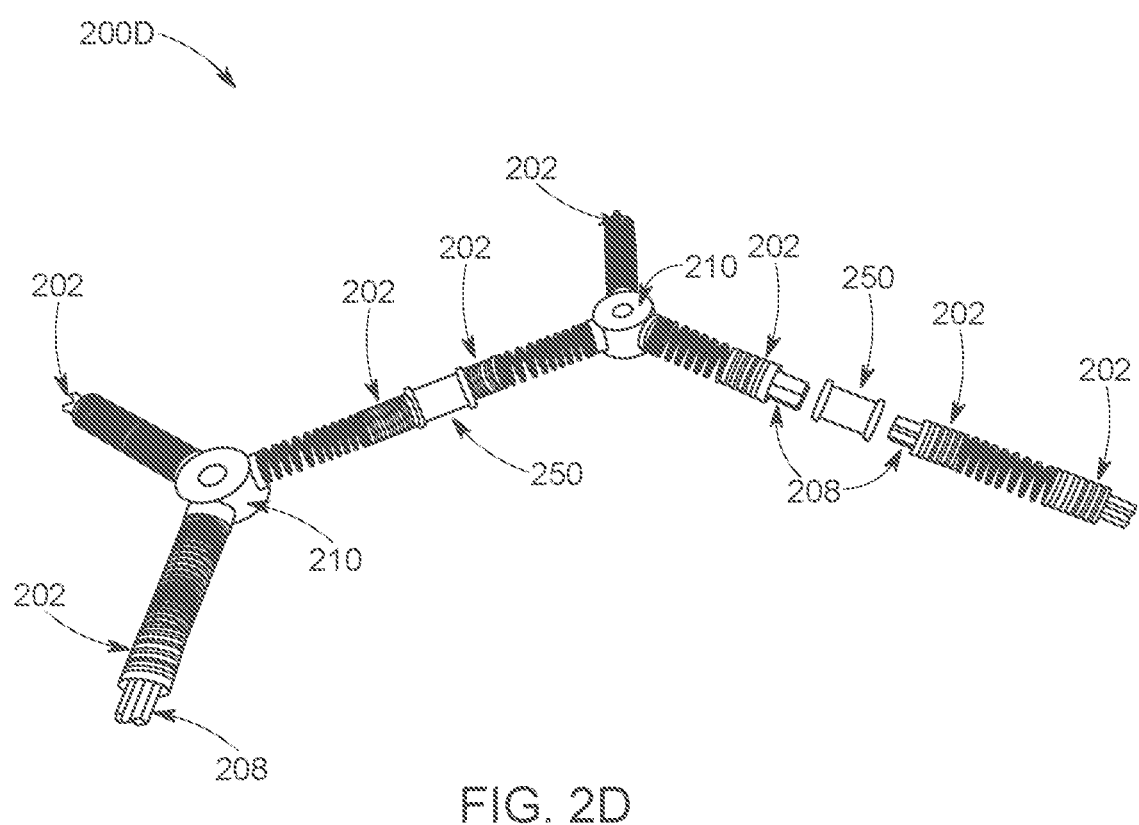
FIG. 2D shows exemplary system, according to an embodiment of the present disclosure.

FIG. 2D shows exemplary system 200D, according to an embodiment of the present disclosure. System 200D includes many components and similar labels to components in FIGS. 2A-2C. In addition, system 200D includes second connector elements 250a and 250b. Interior portions of connector elements 250a and 250b are indented, corresponding to end portions 208 of connector elements 202. Therefore, connector elements 250a and 250b couple with a snap-fit. For example, connector elements 250 have female end portions, and connector elements 202 have male end portions.

Figure 3A:
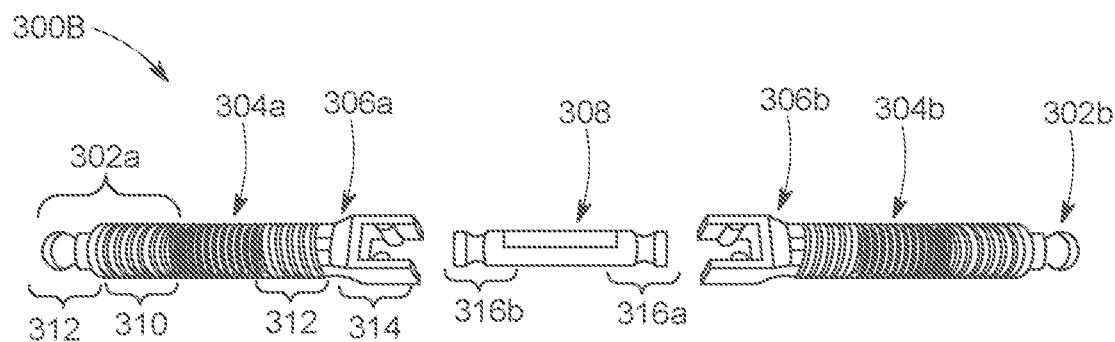
FIGS. 3A-3C show exemplary configurations of various member systems, according to an embodiment of the present disclosure.
Figure 3B:
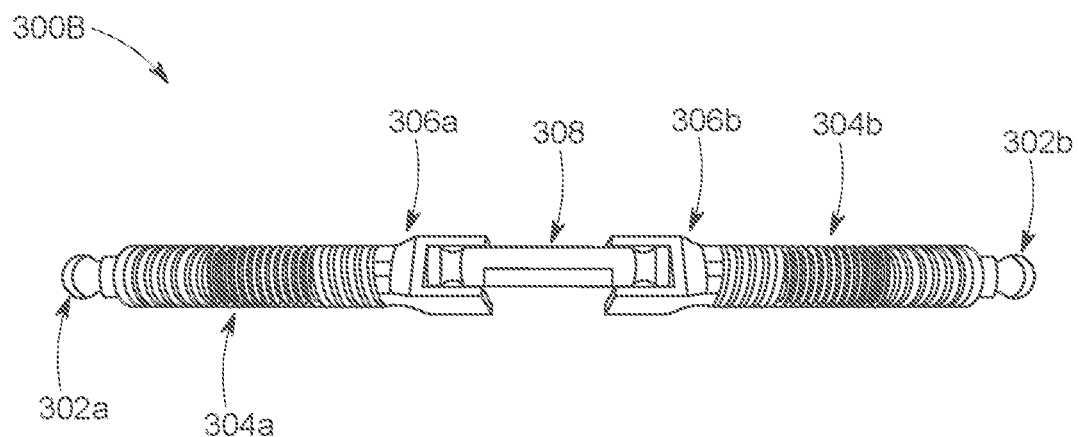
Figure 3C:
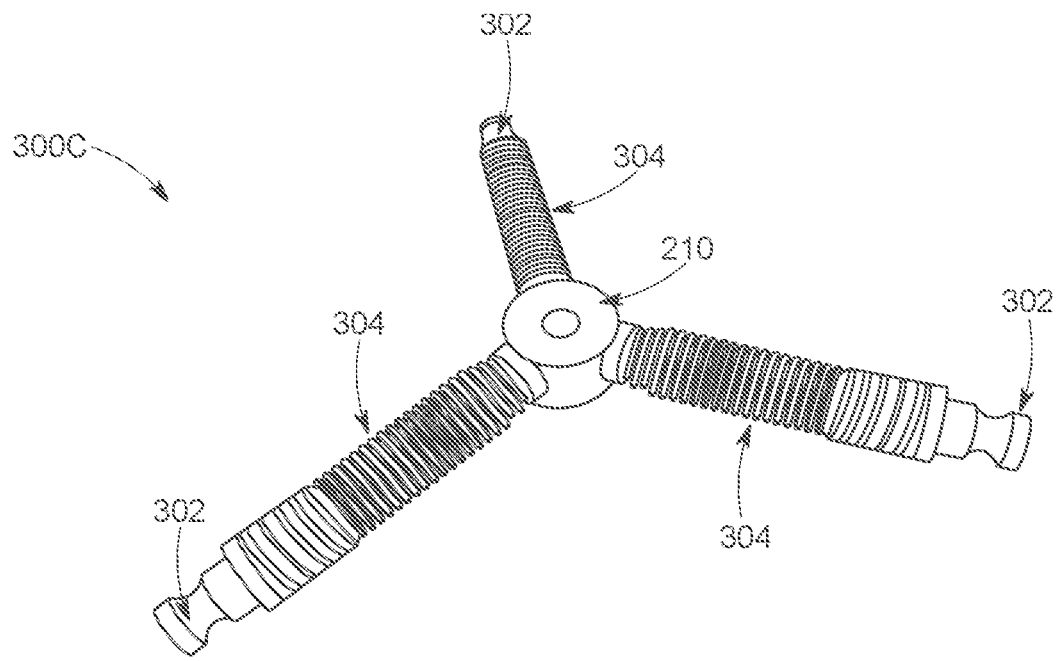

FIGS. 3A-3C show exemplary configurations of various member systems, according to embodiments of the present disclosure. FIG. 3A shows configuration 300A, including connector elements 302a and 302b, resilient members 304a and 304b, second connector elements 306a and 306b, and third connector elements 308. Connector elements 302a and 302b each include a male connector end portion 312 and a threaded portion 310, as shown with respect to connector element 302. Threaded portion 310 is configured to receive spring coils of a resilient member 304a or 304b along grooves in the threaded portion 310. Connector elements 306a and 306b each include a threaded portion 312 and female connector end portion 314, as shown with respect to connector element 306a. Grooves in the threaded portion 312 receive spring coils of either resilient member 304a or 304b. The female connector end portion 314 receives a male connector end portion 316b of connector element 316a. In some examples, female connector end portion 314 is further configured to receive male connector end portion 312 of connector elements 302a and 302b.

FIG. 3B shows a coupled configuration 300B where connector element 308 is received by connector elements 306a and 306b. FIG. 3C demonstrates a configuration 300C. FIG. 3A includes many components and similar labels to components in FIGS. 2A-2C. In addition, configuration 300C includes a central node 210 (e.g., central node 210 as shown and discussed regarding FIGS. 2B and 2C).

Figure 4A:
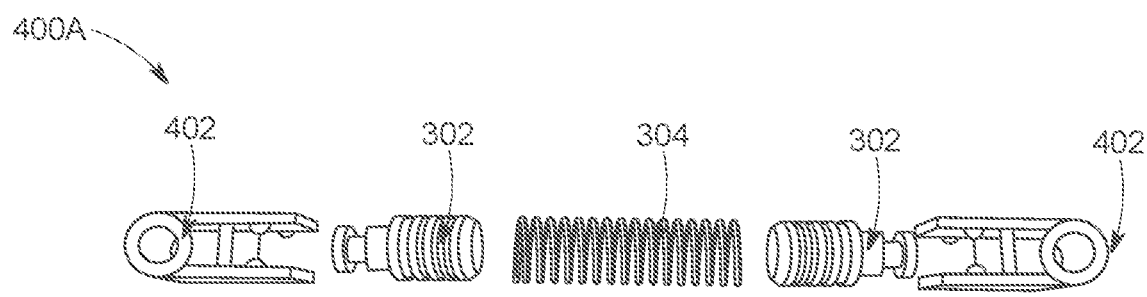
FIGS. 4A-4C show exemplary configurations of various member systems, according to an embodiment of the present disclosure.
Figure 4B:
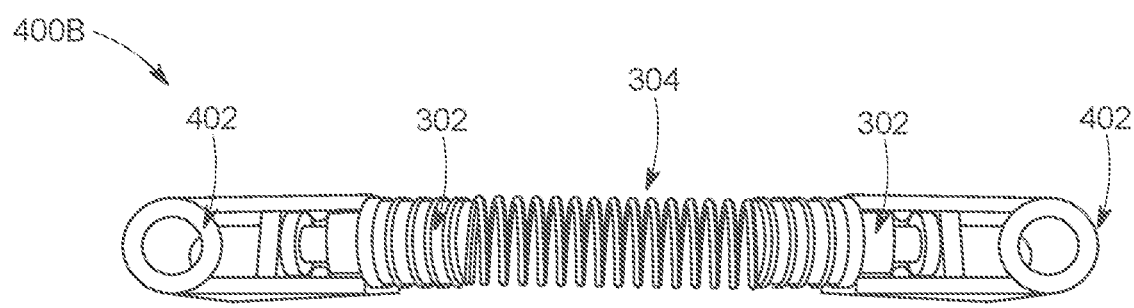
Figure 4C:
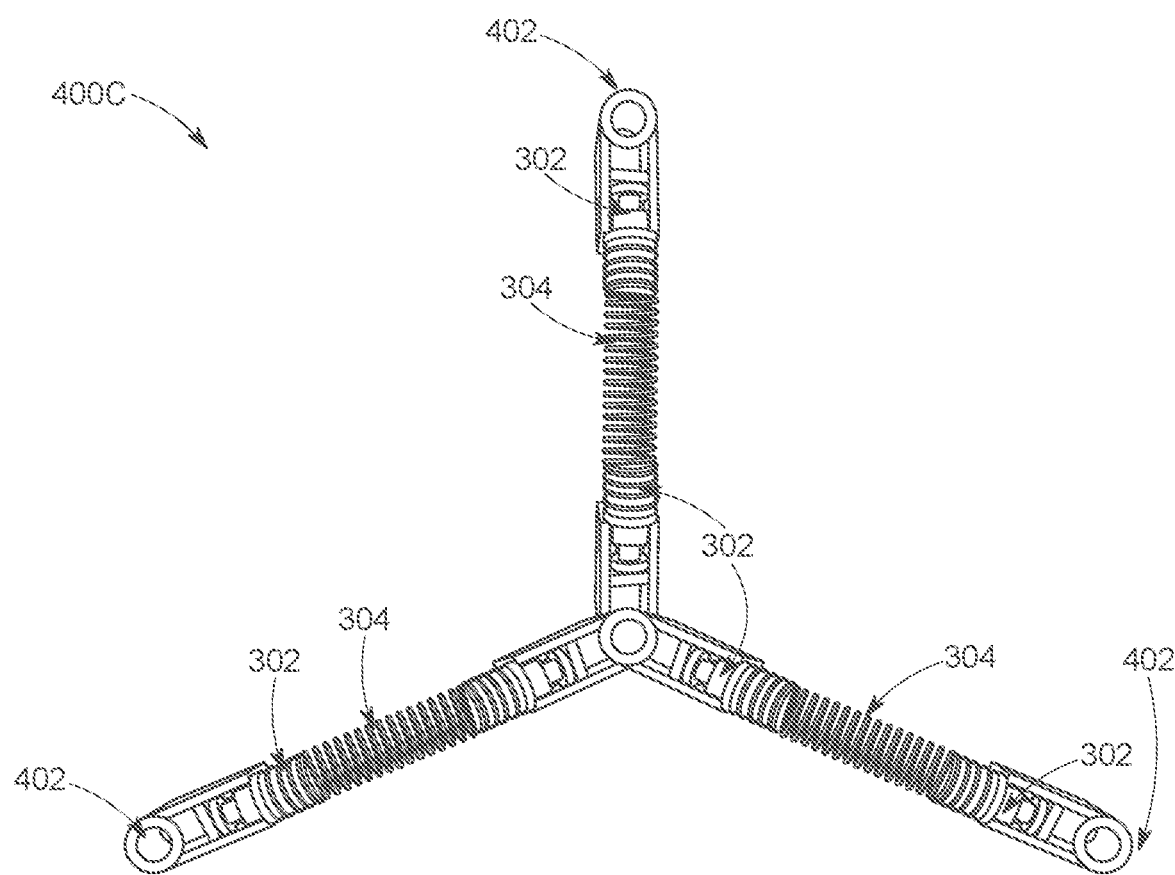

FIGS. 4A-4C show exemplary configurations of various member systems, according to embodiments of the present disclosure. FIG. 4A includes many components and similar labels to components in FIGS. 3A-3C. In addition, FIG. 4A includes connector element 402. One end of connector element 402 is a female end portion, configured to receive the male end portion of connector element 302. FIG. 4A shows an exploded configuration 400A, and FIG. 4B shows a coupled configuration 400B. FIG. 4C includes many components and similar labels to components in FIGS. 4A-4B. In addition, FIG. 4C includes connector element 404, which includes three arms, each arm having a female end portion configured to receive the male end portion of connector element 302.

Therefore, FIGS. 3A-4C show how various embodiments of the present disclosure can integrate with rod and connector elements, from similar and/or different systems. For example, connector elements 302 and 306 are shaped with (1) a threaded portion which couples with a resilient member of the systems discussed above in FIGS. 1A-2D and (2) a connector end portion which couples with new connector elements 308. Consequently, any new connector elements can be used in the disclosed systems by modifying connector portions 314 and 312 of connector elements 302 and 306, respectively.

Figure 5A:
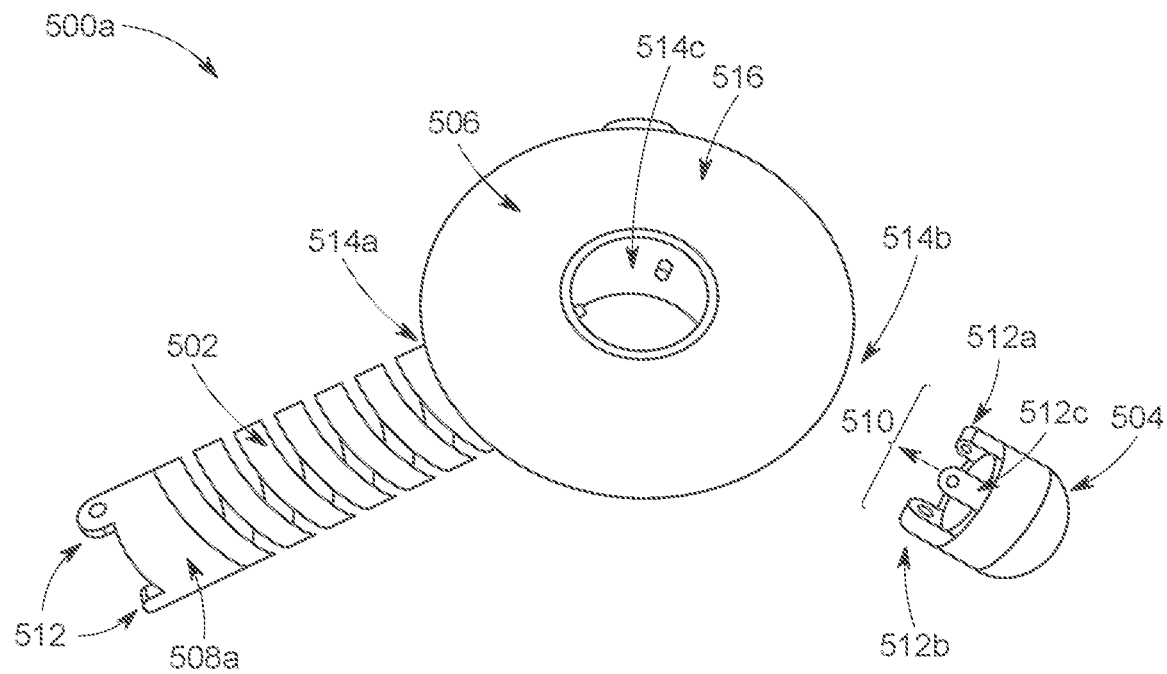
FIGS. 5A-5B show an exemplary system, according to an embodiment of the present disclosure.
Figure 5B:
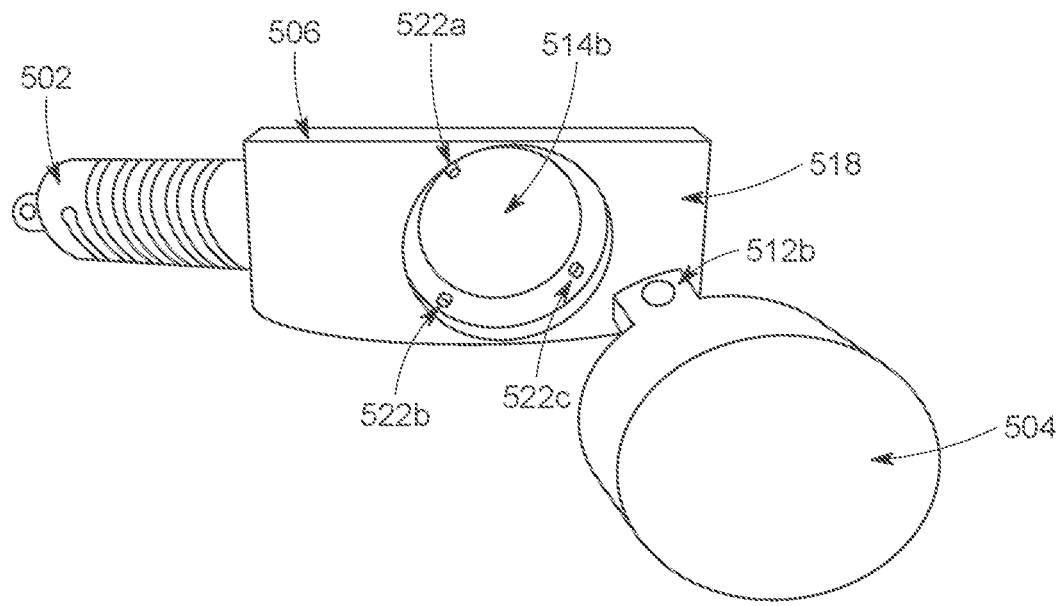

FIG. 5A shows an exemplary system 500A, according to an embodiment of the present disclosure. System 500A includes resilient member 502, electronic device 504, and central node 506. FIG. 5B shows a side view 500B of the components shown in FIG. 5A, and will be discussed in tandem with FIG. 5A. Resilient member 502 includes a first end portion 508a and a second end portion 508b. Second end portion 508b of resilient member 502 is entirely enclosed in central node 506 and is not visible in the disclosed views. Electronic device 504 further includes an end portion 512. End portions 508a, 508b, and 510 are identical, and each include a plurality of receiving elements 512. For example, electronic device 504 includes three receiving elements 512a, 512b, and 512c.

Central node 506 includes one or more holding portions 514a, 514b, 514c. Although three holding portions 514a, 514b, and 514c are pictured, central node 506 can include additional holding portions around a side portion 518, top portion 516, or bottom portion (not pictured). For example, resilient member 502 is received in holding portion 514a, and electronic device 504 is received in holding portion 514b. For example, a holding portion 514c is located on a top portion 516 of central node 506 while holding portions 514a and 514b are located along a side portion 518 of central node 506. Each holding portion 514a, 514b, 514c, and any other holding portions (not shown) of central node 506 are identical, such that resilient members 502 or electronic devices 504 can be received at any holding portion.

FIG. 5B further demonstrates that each holding portion of a central node further includes a plurality of tabs 522a, 522b, and 522c. For example, the tabs 522a, 522b, and 522c are aligned along an exterior portion of the holding portion, such that each tab 522a, 522b, and 522c corresponds to a receiving element 512 of the electronic device 504 (or of the resilient member 502). For example, tabs 522a, 522b, and 522c provide electrical connection between the electronic device 504 and the central node 506, such that the electronic device 504 is communicably coupled with the central node 506. For example, the central node 506 can include various electronic components (not shown) which provide power and/or instructions to the electronic device 504.

FIGS. 6A-6D show exemplary elements configured to couple with a central node 506, according to an embodiment of the present disclosure.

Figure 6A:
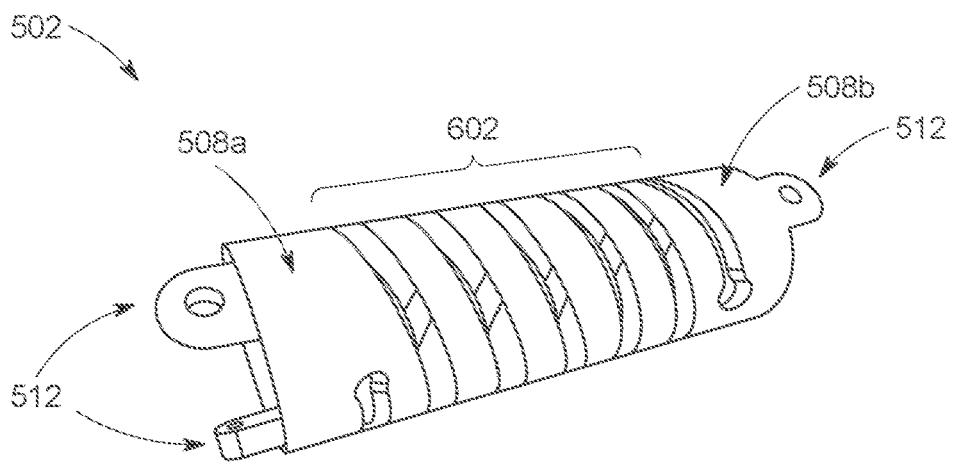
FIGS. 6A-6D show exemplary elements configured to couple with a central node, according to an embodiment of the present disclosure.
Figure 6B:
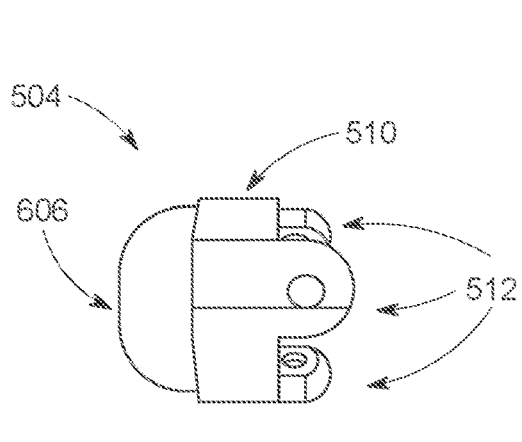

FIG. 6A shows resilient member 502 and includes similar components and labeling as in FIG. 5A. FIG. 6A further identifies compression portion 602. In some examples, compression portion 602 is a machined spring. FIG. 6B further shows a side view of resilient member 502, where an interior portion 604 of resilient member 502 is hollow.

Resilient members can be built through specific patterns. These patterns can easily be made using 3D printers (additive manufacturing) or through by making cuts in the material (subtractive manufacturing). As seen in the illustrations, these can be helical like springs, or back and forth in a single plane. These single plane springs can be used together to make springs with different tensions in specific directions. Also, by other resilient members other than springs (which are difficult to connect to other elements), the connection points (e.g. holes for bolts) can be part of the same element. A machined connecting element can advantageously be formed as a single unitary piece with connecting structures (such as receiving elements 512) fabricated as part of that unitary piece. In this manner, manufacturing can be simplified and cost reduced, while the strength of the piece is improved.

Figure 6C:
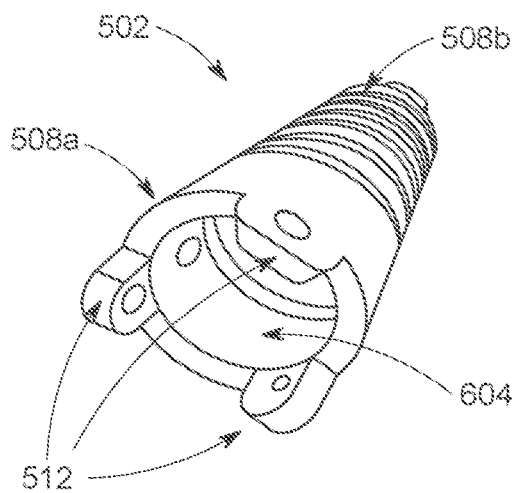

FIG. 6C shows electronic device 504 and includes similar components and labeling as in FIGS. 5A-5B. FIG. 6C further includes a cap portion 606. For example, cap portion 606 houses an LED, a light source, a video camera, a microphone, or another electronic module. For example, the cap portion 606 is communicably coupled to a central node (e.g., central node 506 of FIGS. 5A-5B) and is operated according to instructions from the central node.

Figure 6D:
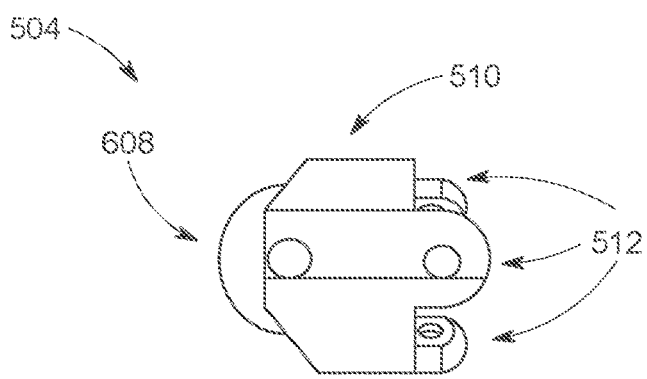

FIG. 6D shows electronic device 504 and includes similar components and labeling as in FIGS. 5A-5B. FIG. 6D further includes a wheel 608. For example, the wheel 608 is communicably coupled to a central node (e.g., central node 506 of FIGS. 5A-5B) and is operated according to instructions from the central node.

Figure 7A:
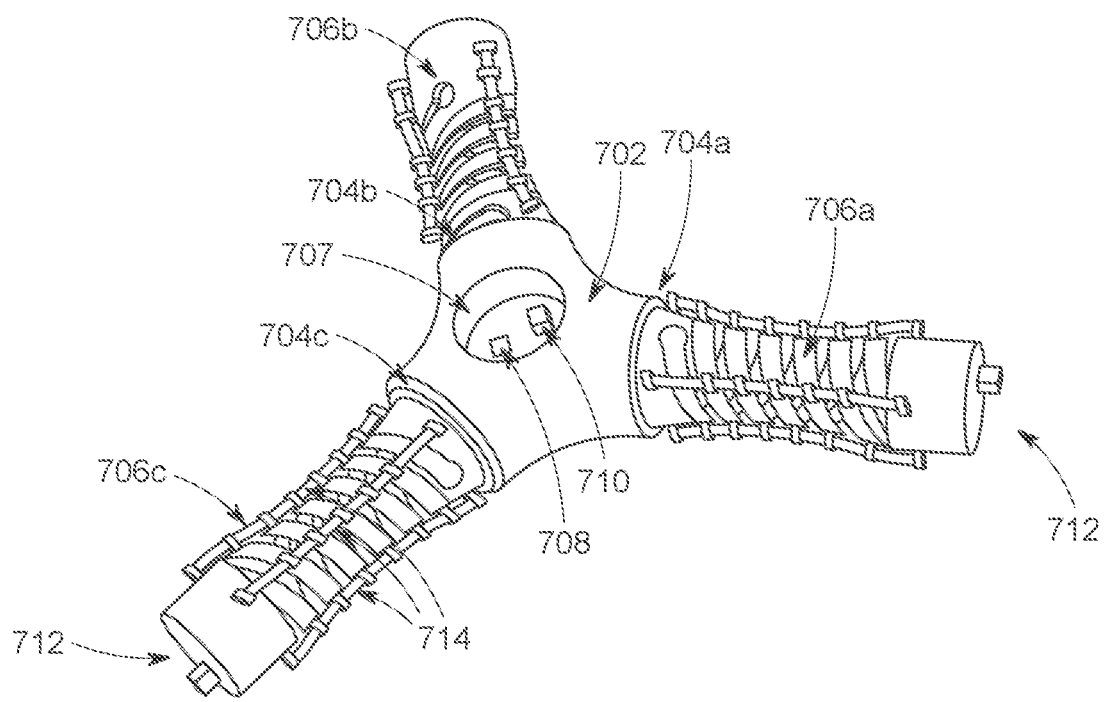
FIGS. 7A-7B show an exemplary system, according to an embodiment of the present disclosure.

FIG. 7A shows an exemplary system 700A, according to an embodiment of the present disclosure. System 700A includes a central node 702; resilient members 706a, 706b, and 706c, and a holding portion 707.

In some examples, central node 702 includes an actuator, a communication element, a battery, a processor, or other electronic components. As used herein, a communication element may be any device that is capable of transmitting and receiving communication signals, such as radiofrequency or optical signals. A holding portion 707 is disposed along exterior portions of the central node 702. For example, holding portion 707 is an indented receiving portion, comprising a female connector element 708 and a male connector element 710 (as shown in holding portion 704d). Central node 702 further includes a plurality of junctions 704a, 704b, and 704c, which house resilient members 706a, 706b, and 706c. In some examples, resilient members 706a, 706b, and 706c are communicably coupled with any electronic components housed in central node 702.

Figure 8:
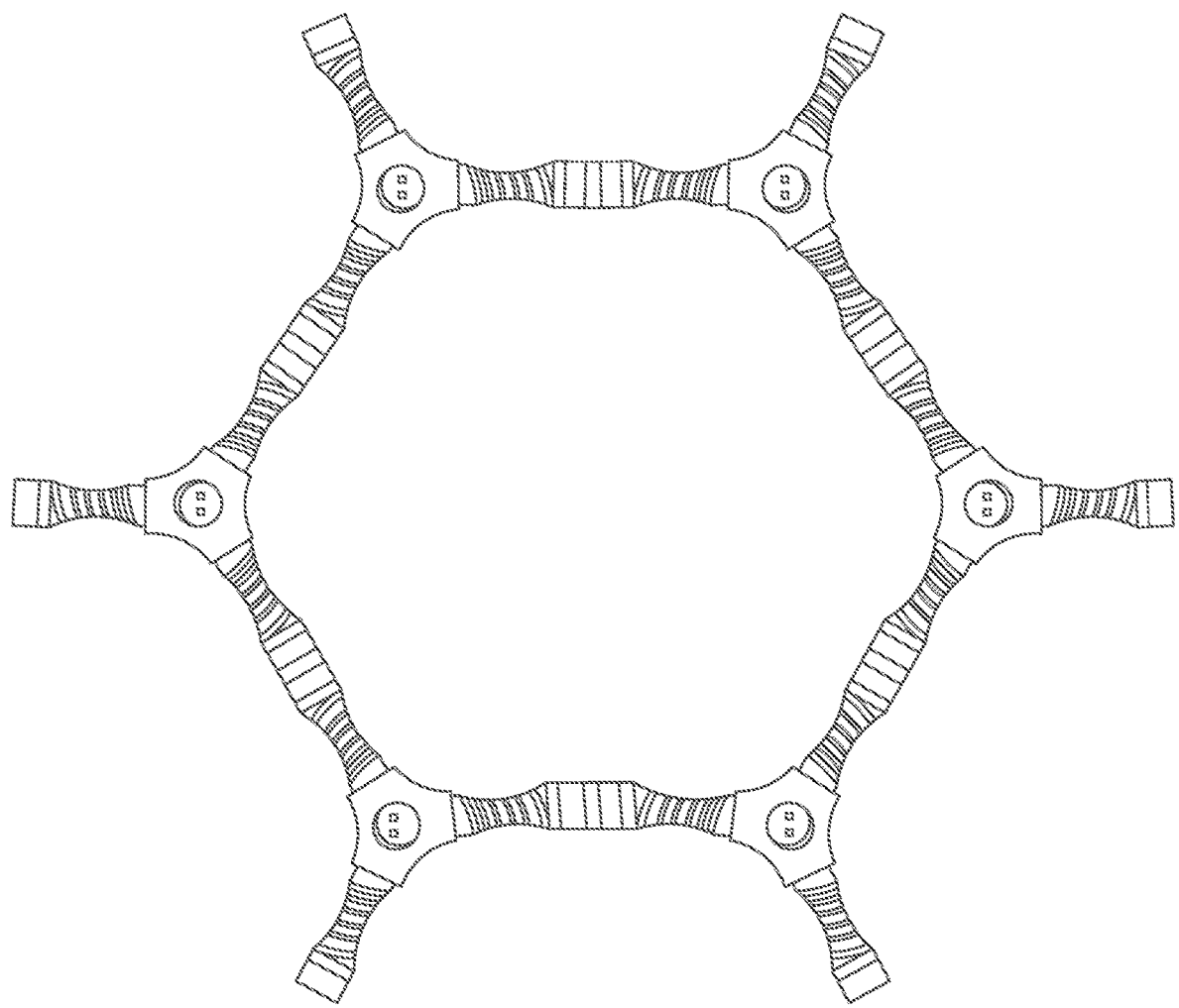
FIG. 8 shows an exemplary hexagonal configuration, according to an embodiment of the present disclosure.

End portions of each resilient member 706a, 706b, and 706c further include a male connector element 710 (as shown in resilient member 706a and 706c) and a female connector element (not shown). For example, a snap fit (shown in FIG. 8 as a hexagonal configuration) is achieved by aligning and connecting (1) the male connectors 712 of the end portions of a resilient member 706a, 706b, or 706c with a female connector 708 of a holding portion 707 and (2) the female connectors of the end portions of a resilient member 706a, 706b, or 706c with a male connector 710 of a holding portion 707. For example, a snap fit is achieved by aligning and connecting (1) the male connectors 712 of the end portions of a resilient member 706a, 706b, or 706c with a female connector of another resilient member 706a, 706b, or 706c and (2) the female connectors of the end portions of a resilient member 706a, 706b, or 706c with a male connector 710 of another resilient member 706a, 706b, or 706c.

Resilient members 706a, 706b, and 706c further include a plurality of cables 714 extending along a longitudinal axis of each resilient member 706a, 706b, and 706c. For example, an actuator housed in central node 702 controls movement of each resilient member 706a, 706b, and 706c by the cables 714. In some examples, each resilient member 706a, 706b, and 706c includes four cables 714, equally spaced along an exterior surface of the resilient member 706a, 706b, 706c. Four cables 714 effects a full range of movement of the resilient member 706a, 706b, 706c. In some examples, each resilient member 706a, 706b, and 706c includes three cables 714, equally spaced along an exterior surface of the resilient member 706a, 706b, 706c. In other examples, resilient member 706a, 706b, and 706c include more or fewer cables 714.

Figure 7B:
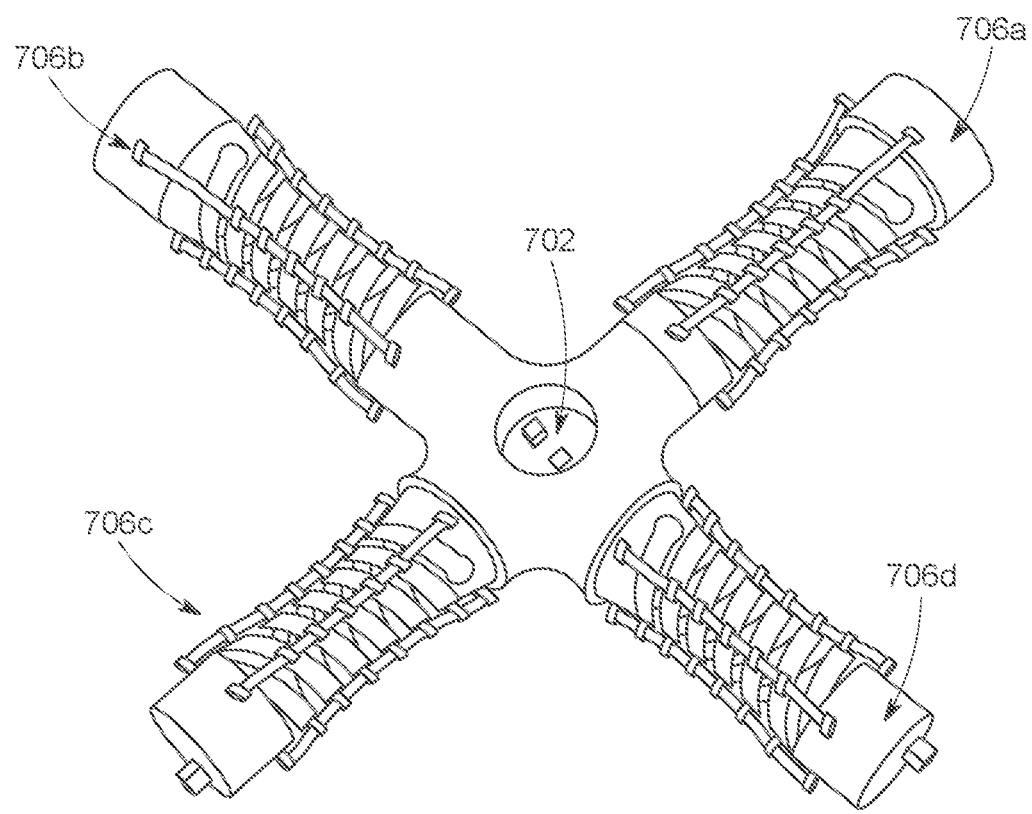

FIG. 7B shows a similar system as FIG. 7A, where central node 702 is configured to house four resilient members 706a, 706b, 706c, and 706d. Therefore, an exemplary central node 702, according to the present disclosure can house more or fewer resilient members than pictured in FIGS. 7A and 7B.

Altogether, FIGS. 1A-8 demonstrate the versatility and functionality of systems of the present disclosure, which can be easily modified to change between models and toy systems, electronic systems, clasp systems, robotic systems, medical devices, space systems, and any other devices, systems, or instruments which require multiple configurations. This is unique from existing systems, which cannot easily change functionalities.

Figure 9A:
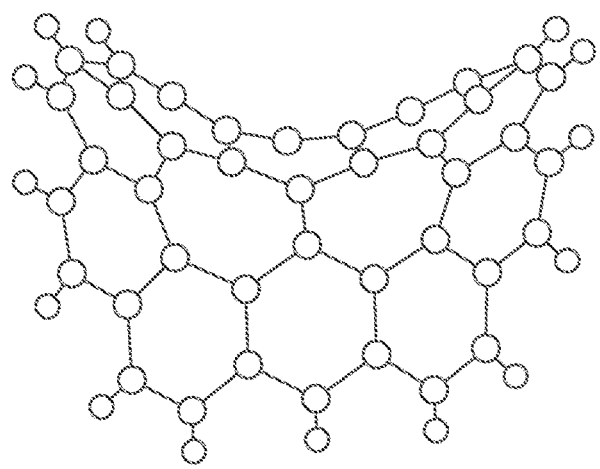
FIGS. 9A-9C show exemplary systems, according to various embodiments of the present disclosure.
Figure 9B:
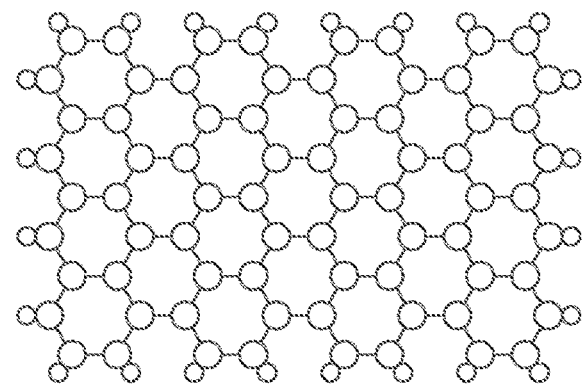
Figure 9C:
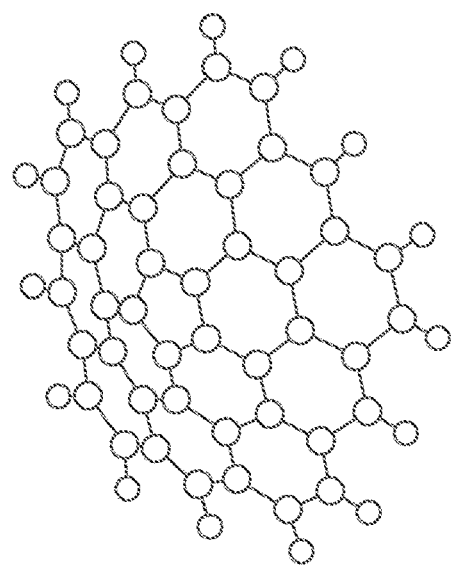

FIGS. 9A-9C show exemplary systems, according to various embodiments of the present disclosure. For example, the systems of FIGS. 1A-8 can be configured in these shapes. These figures show exemplary geometry that is formed, according to the various embodiments, when nodes are attached in shown geometric configurations. When the disclosed systems are coupled in the configurations of FIGS. 9A-9C, the systems passively remain in these shapes without external actuation needed.

Figure 10A:
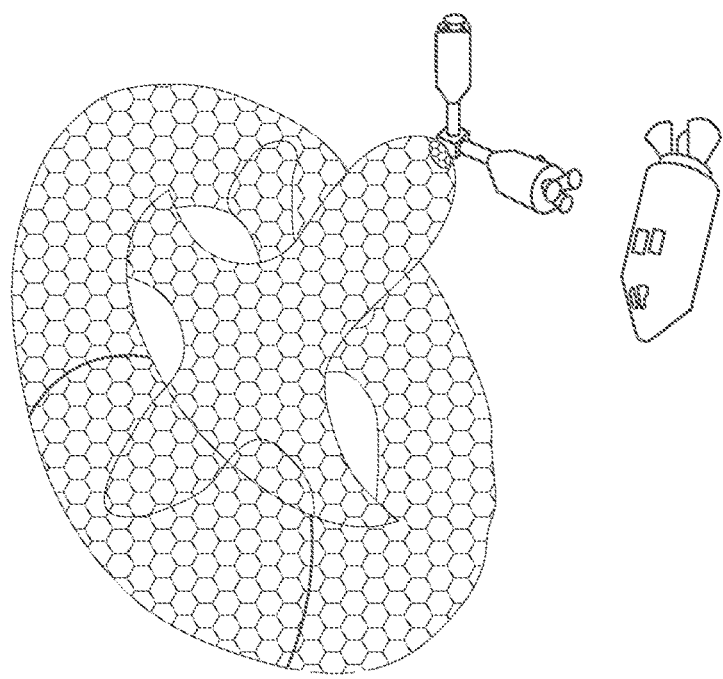
FIGS. 10A-10B show exemplary configurations of a system suitable for robotic tasks, according to various embodiments of the present disclosure.
Figure 10B:
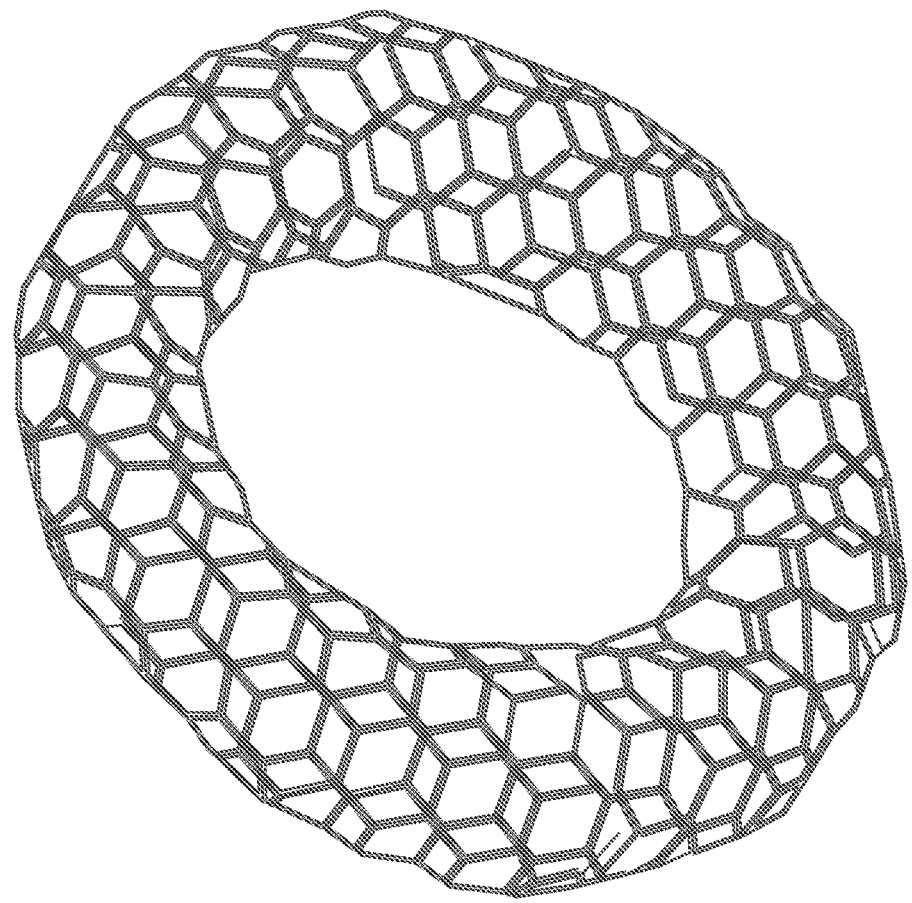

FIGS. 10A-10B show exemplary configurations of a system suitable for robotic tasks, according to various embodiments of the present disclosure. For example, the systems of FIGS. 1A-8 can be configured in these shapes. In some examples, the systems can provide a constructed frame to assist in construction of large structures in low to zero gravity environments, particularly an artificial gravity space ring, using the embodiments of these present disclosures.

Figure 11A:
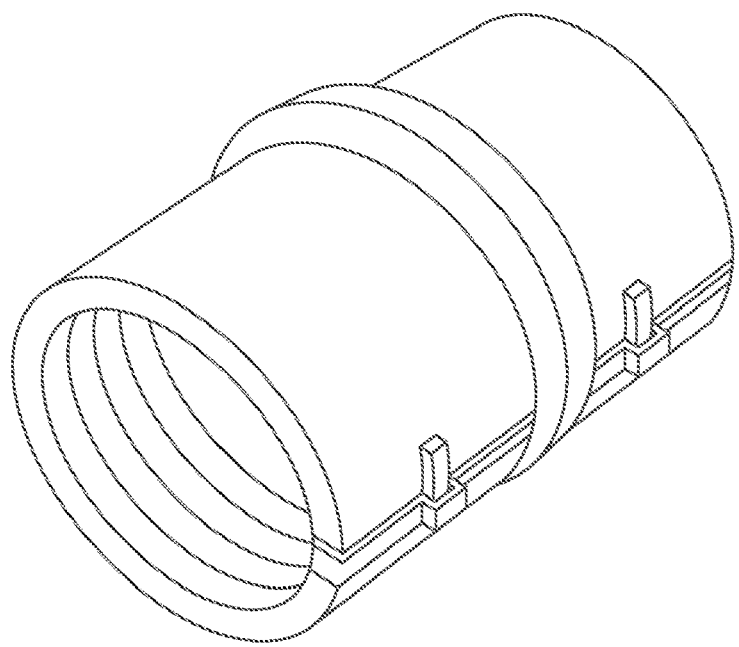
FIG. 11A shows an exemplary connector element, according to an embodiment of the present disclosure.
Figure 11B:
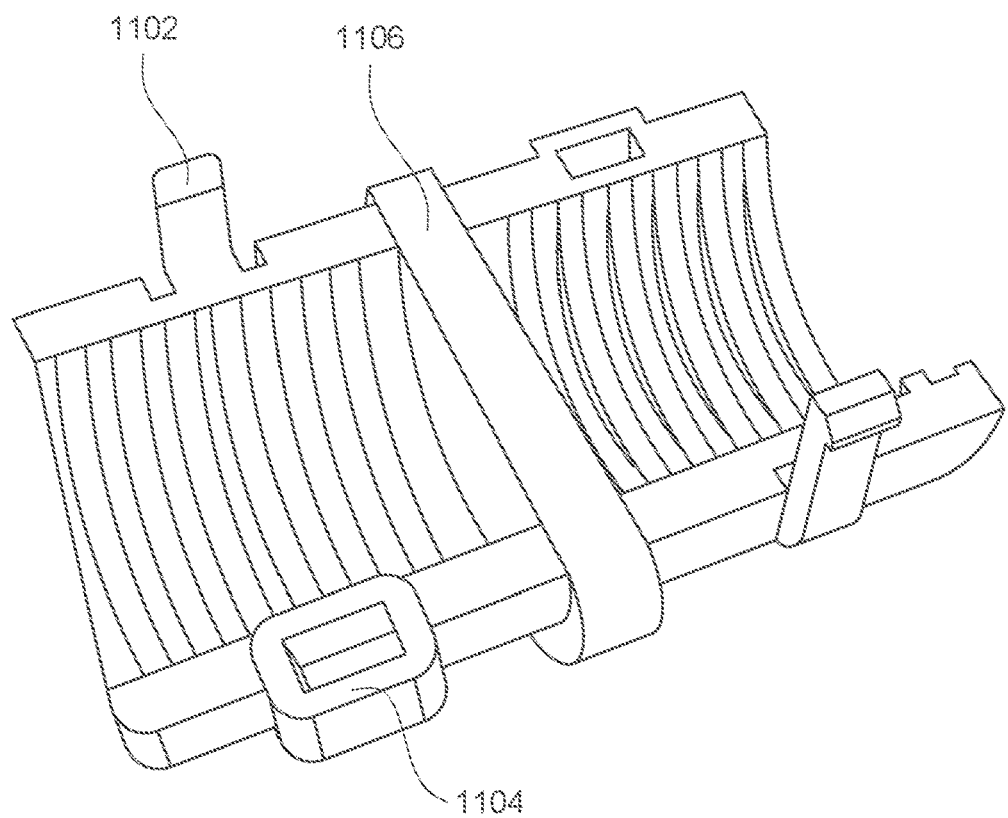
FIG. 11B shows a first portion of the exemplary connector element of FIG. 11A, according to an embodiment of the present disclosure.

FIG. 11A shows an exemplary connector element, according to an embodiment of the present disclosure. For example, the connector element is hollow and is configured to receive a resilient member along threaded, interior portions. FIG. 11B shows a first portion of the exemplary connector element, according to an embodiment of the present disclosure. For example, two identical portions of the connector element receive each other via clasps and achieve a snap fit (yielding the connector element shown in FIG. 11A). For example, hooks 1102 may interlock with receptacles 1104 on an opposed connecting element. A connecting element may also include a central wall 1106, which may help control the position of the resilient members relative to the connecting elements.

Figure 12:
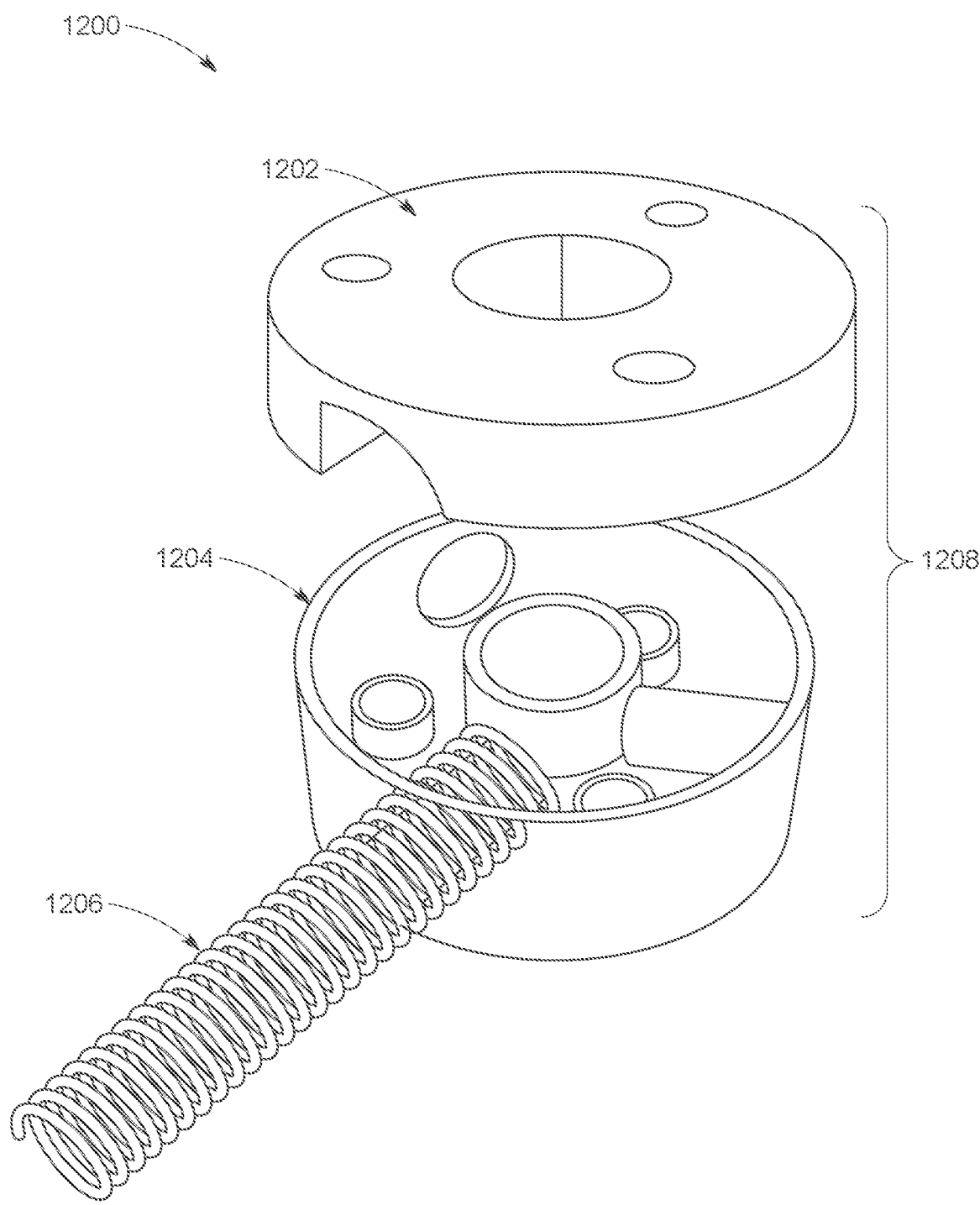
FIG. 12 shows an exemplary central node, according to an embodiment of the present disclosure.

FIG. 12 shows an exemplary system, according to an embodiment of the present disclosure. For example, a bottom portion 1204 of a central node 1208 receives a top portion 1202 of central node 1208. Bottom portion 1204 is further configured to receive a resilient member 1206 in openings along an exterior of the bottom portion 1204.

Figure 13A:
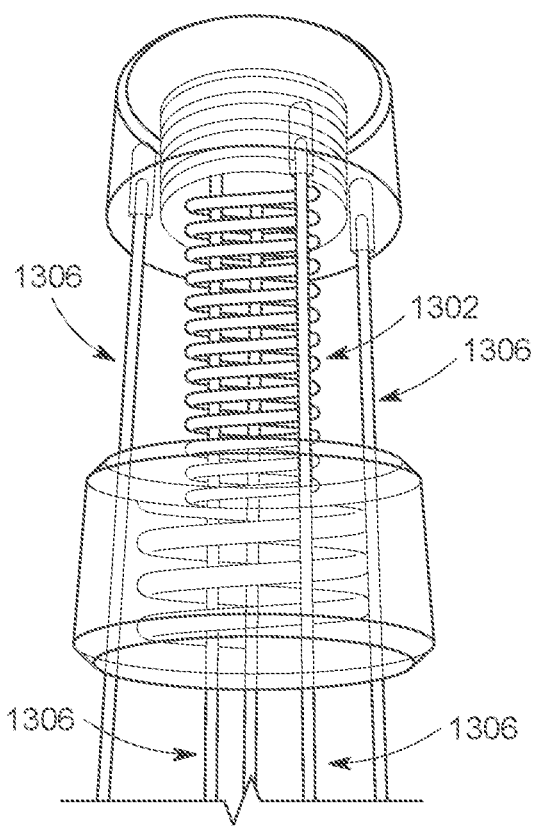
FIGS. 13A-13C further demonstrate additional cable configurations along exterior surfaces of exemplary resilient members.
Figure 13B:
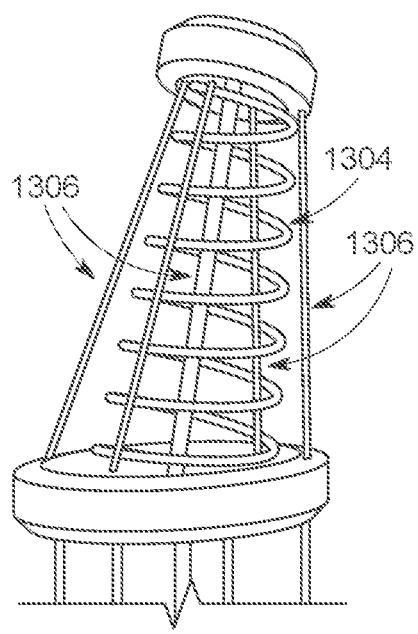
Figure 13C:
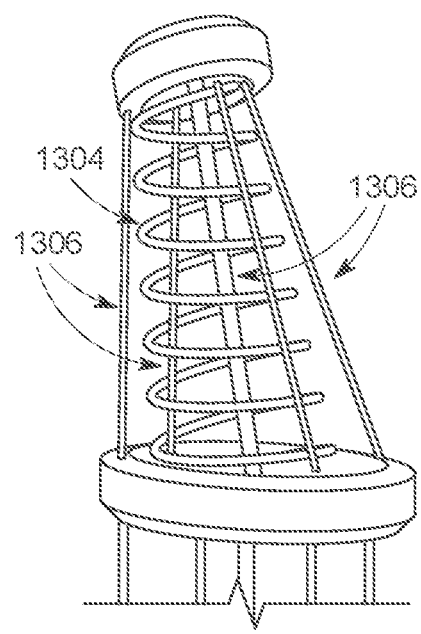

FIGS. 13A-13C further demonstrate additional cable configurations along exterior surfaces of exemplary resilient members. For example, resilient member 1302 shown in FIG. 13A is an hourglass shape. For example, the resilient member 1304 shown in FIGS. 13B and 13C is a conical shape. The resilient members are moved by increasing the tension on one or more cables 1306. In some examples, the center cable may be a wire for transferring electric power and signals in the interior of resilient member 1302. In some embodiments, cables 1306 limit a maximum extension of the resilient member 1306. In some embodiments, cables 1306 may thus enable motion of the resilient member, limit the resilient member's extension, or both. Cables 1306 may extend along the sides of a resilient member or through a central portion of a resilient member.

Figure 14A:
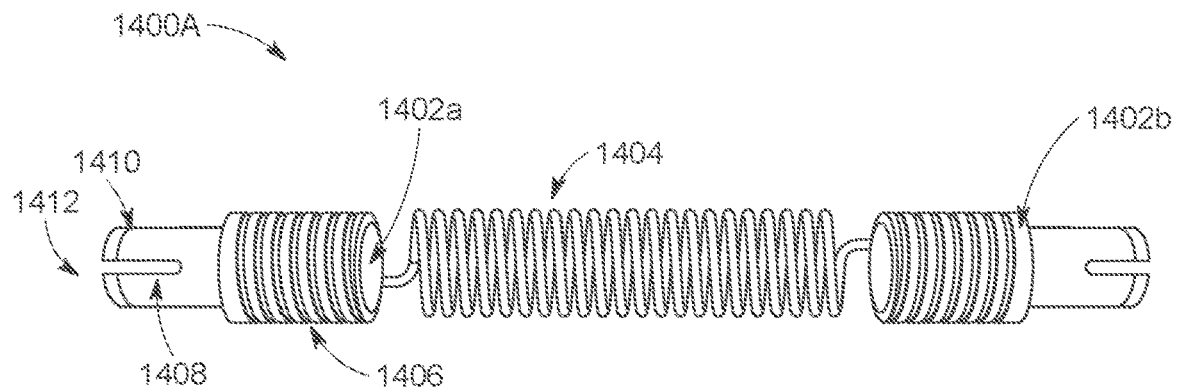
FIGS. 14A-14C show an exemplary system, according to an embodiment of the present disclosure.
Figure 14B:
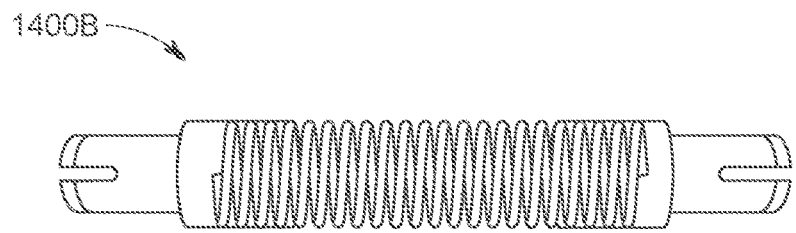
Figure 14C:
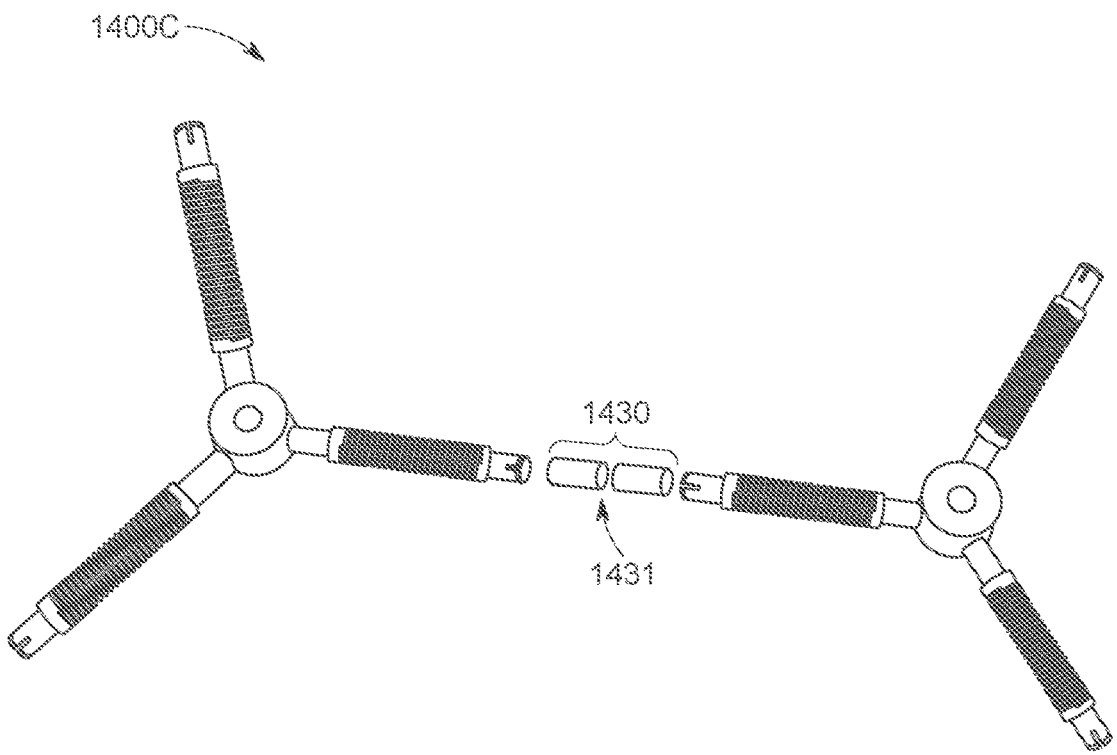

FIG. 14A shows an exemplary system 1400A, according to an embodiment of the present disclosure. System 1400A includes connectors 1402a and 1402b, and a resilient member 1404. For example, resilient member 1404 is a helical compression spring. In other examples, resilient member 1404 is another elastic element. As shown regarding connector 1402a, connectors 1402a and 1402 provide a threaded portion 1406, an extension portion 1408, at least one opening 1410, and a protrusion 1412. The resilient member 1404 screws into grooves in the threaded portion 1406 of an elastic member 1402a, 1402b (as shown in FIG. 14B). The opening 1410 provides flexibility for the extension portion 1408, such that a diameter of the extension portion 1408 can be reduced when compressed. As shown in FIG. 14C, a connector element 1430 can receive connectors 1402a and 1402b. For example, connectors 1402a and 1402b slide into opposing ends of connector element 1430. Connector element 1430 includes an opening 1431, through which protrusion 1412 of connectors 1402a and 1402b can extend. Thereby, connectors 1402a and 1402b (and any system to which they are attached, e.g., system 1400A or 1400B) can rotatably move within connector element 1430.

Figure 15A:
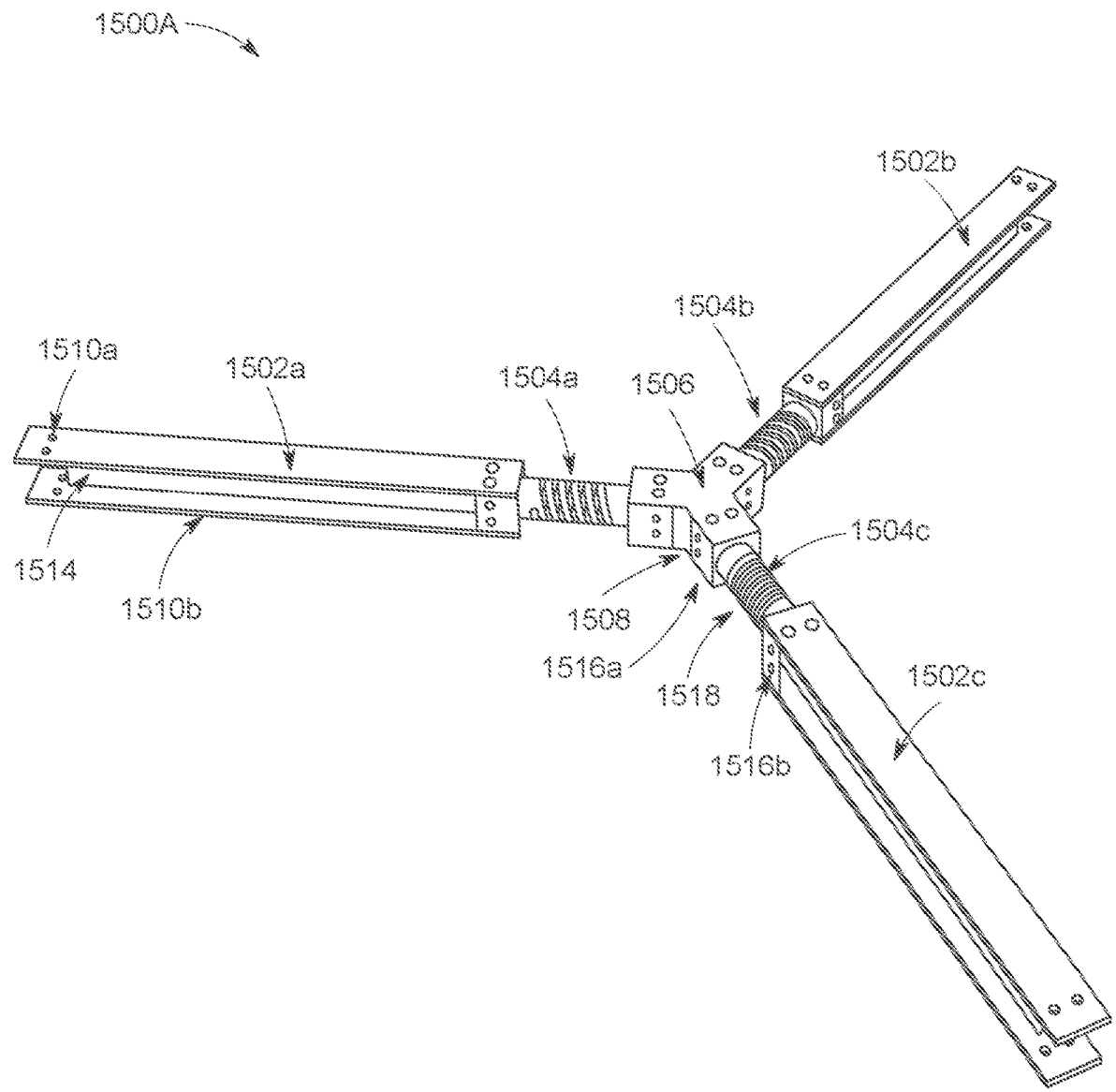
FIG. 15A shows an exemplary system, according to an embodiment of the present disclosure.

FIG. 15A shows an exemplary system 1500A, according to an embodiment of the present disclosure. System 1500A includes a plurality of I-beams 1502a, 1502b, 1502c; a plurality of resilient members 1504a, 1504b, 1504c; a first base portion 1506; and a second base portion 1508.

As shown regarding I-beam 1502a, each I-beam 1502a, 1502b, 1502c includes a first portion 1510a, a second portion 1510b, and a middle portion 1514. Middle portion 1514 is positioned perpendicularly to, and in between, first portion 1510a and second portion 1510b. In some examples, middle portion 1514 has a shorter length than lengths of first portion 1510a and second portion 1510b. Thereby, I-beams 1502a, 1502b, 1502c are symmetrical along longitudinal and latitudinal axes.

As shown regarding resilient member 1504c, each resilient member 1504a, 1504b, 1504c includes end portions 1516a and 1516b, and a resilient portion 1518. For example, resilient portion 1518 is a compression, helical, and/or machined spring. In other examples, resilient portion 1518 is any other elastic member, as known in the art. End portions 1516a and 1516b are shaped to snuggly fit within gaps at end portions of I-beams 1502a, 1502b, 1502c. For example, a resilient member 1504a, 1504b, 1504c can be permanently or removably coupled with an I-beam 1502a, 1502b, or 1502c.

System 1500A further provides base portions 1506 and 1508. For example, base portions 1506 and 1508 include three arms, to which resilient members 1504a, 1504b, 1504c can be permanently or removably coupled. In other examples, base portions 1506 and 1508 have more or fewer arms. Base portions 1506 and 1508 are identical.

Figure 15B:
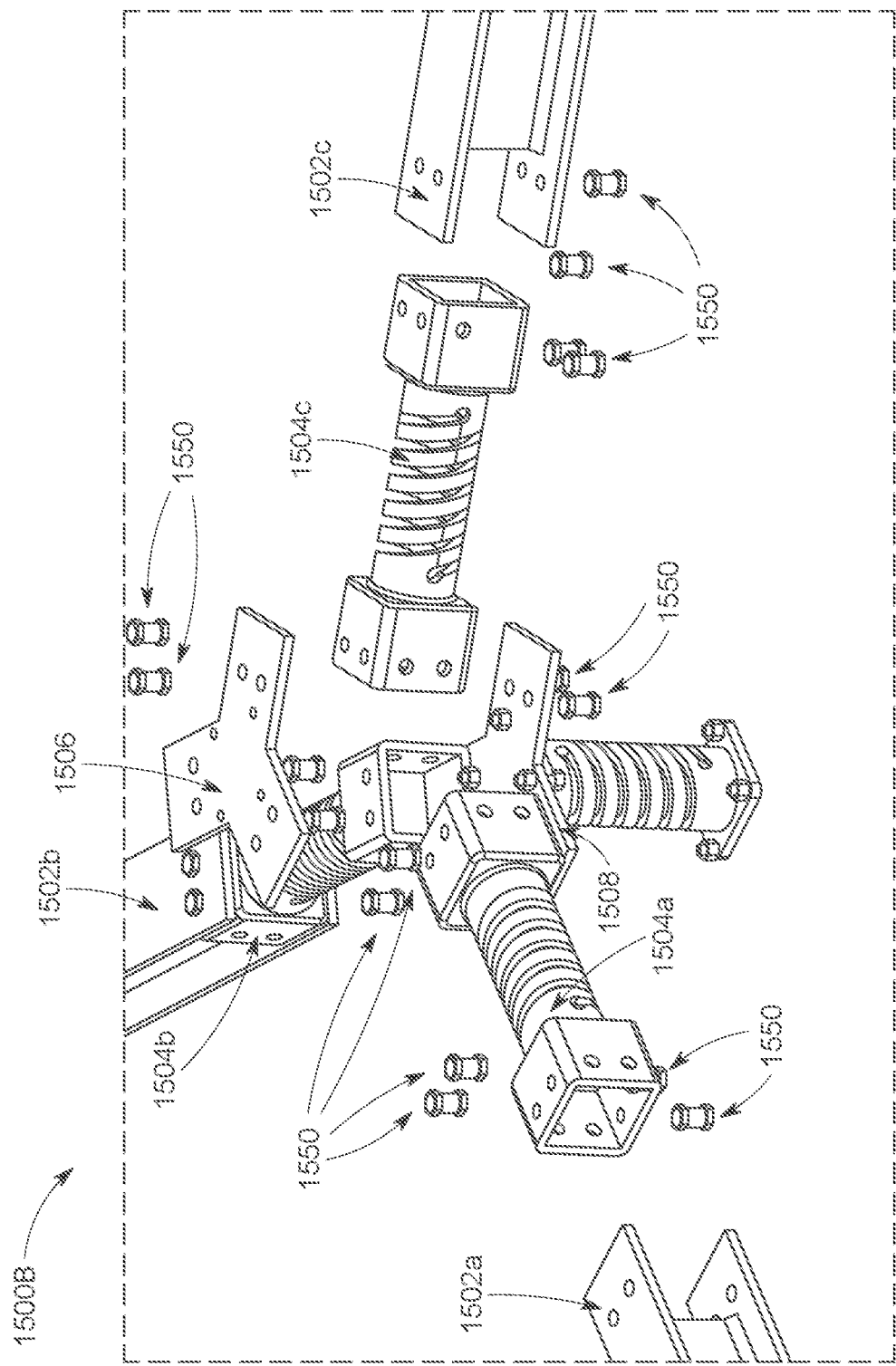
FIG. 15B shows an exploded view of the system of FIG. 15A, according to an embodiment of the present disclosure.

FIG. 15B shows an exploded view 1500B of system 1500A of FIG. 15A, according to an embodiment of the present disclosure. FIG. 15B includes similar components and labels as FIG. 15A. In addition, FIG. 15B shows a plurality of mechanical connectors 1550, which are used to permanently or removably couple I-beams 1502a, 1502b, 1502c and resilient members 1504a, 1504b, 1504c, and resilient members 1504a, 1504b, 1504c and base portions 1506 and 1508. For example, mechanical connectors 1550 are bolts, screws, fasteners, or any other mechanical connector.

Figure 15C:
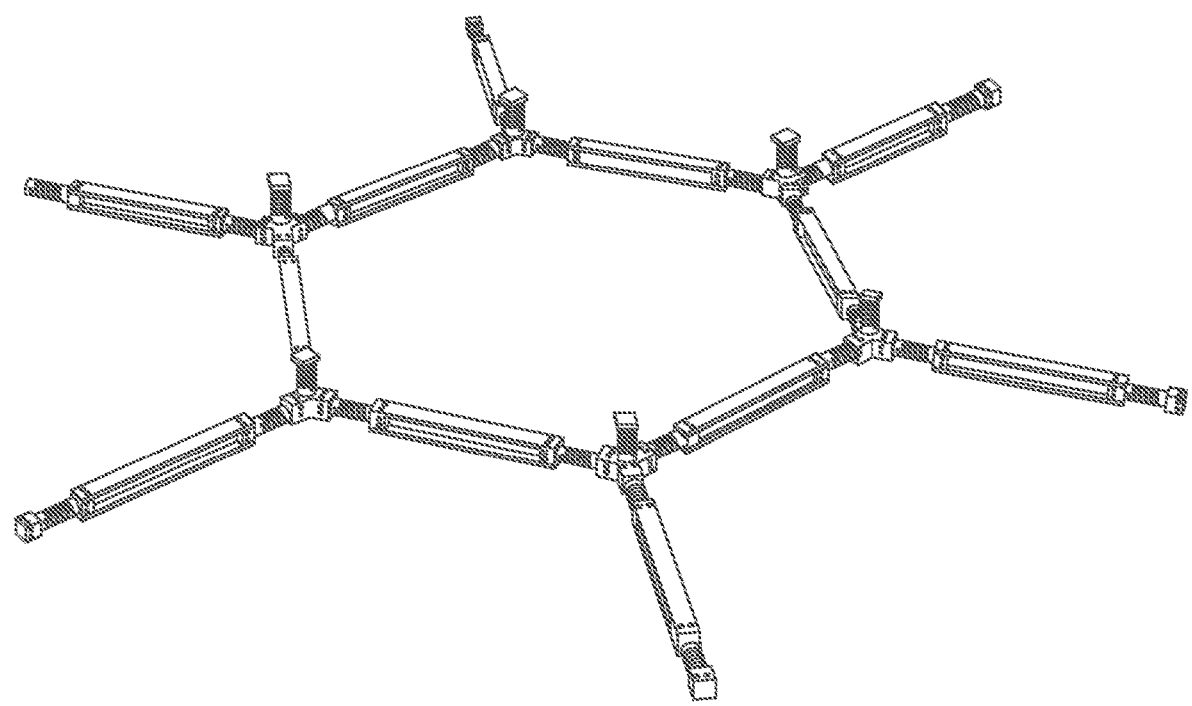
FIGS. 15C-15D show exemplary systems, according to various embodiments of the present disclosure.
Figure 15D:
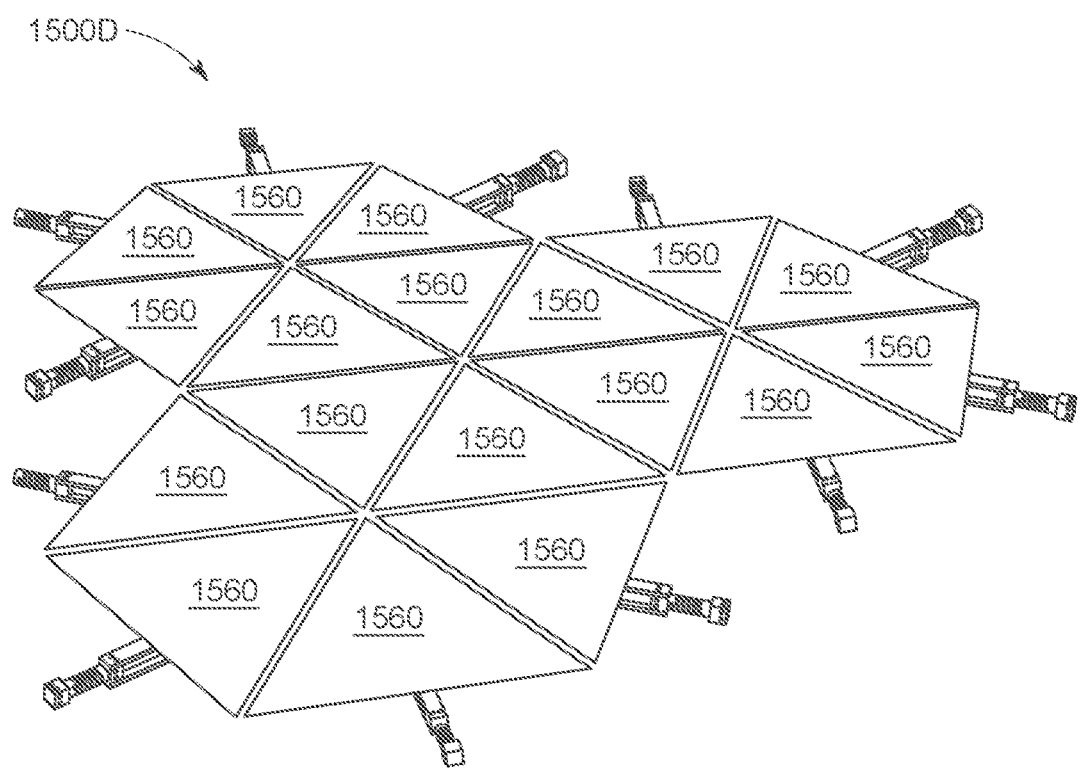

FIG. 15C shows an exemplary configuration of the components shown in FIGS. 15A and 15B. FIG. 15D shows an exemplary system 1500D, where a plurality of panels 1560 are permanently or removably coupled to the structure of FIG. 15C. For example, system 1500D is used to create a 3-D structure, or building, and, in particular, in space technology.

Figure 16:
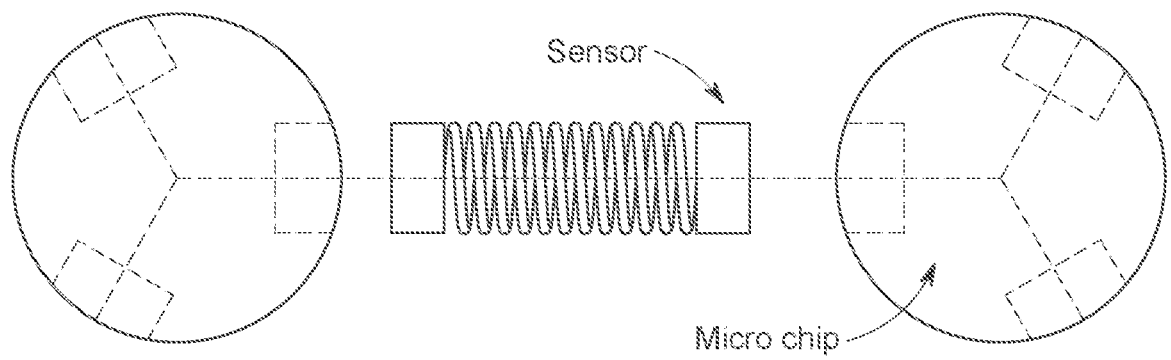
FIG. 16 shows an exemplary resilient member, according to an embodiment of the present disclosure.

FIG. 16 shows an exemplary resilient member, according to an embodiment of the present disclosure. For example, a resilient member can include microchips and/or sensors on end portions of the resilient member. Such microchips and sensors may be incorporated into any of the embodiments described herein using the arrangements shown in FIG. 16.

Figure 17:
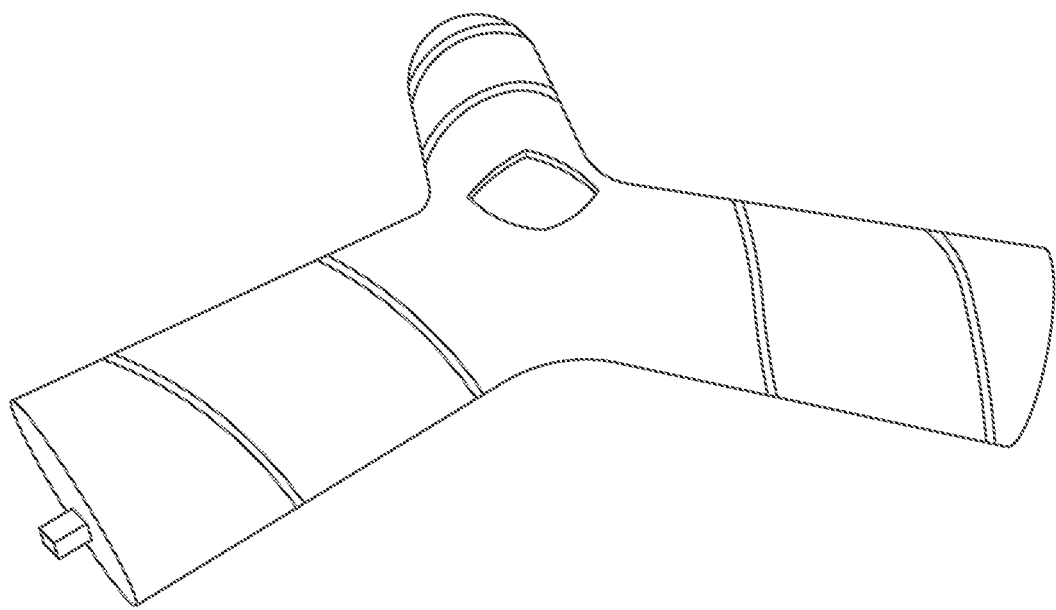
FIG. 17 shows an exemplary cover apparatus a system, according to an embodiment of the present disclosure.

FIG. 17 shows an exemplary cover apparatus for a system, according to an embodiment of the present disclosure.

Figure 18:
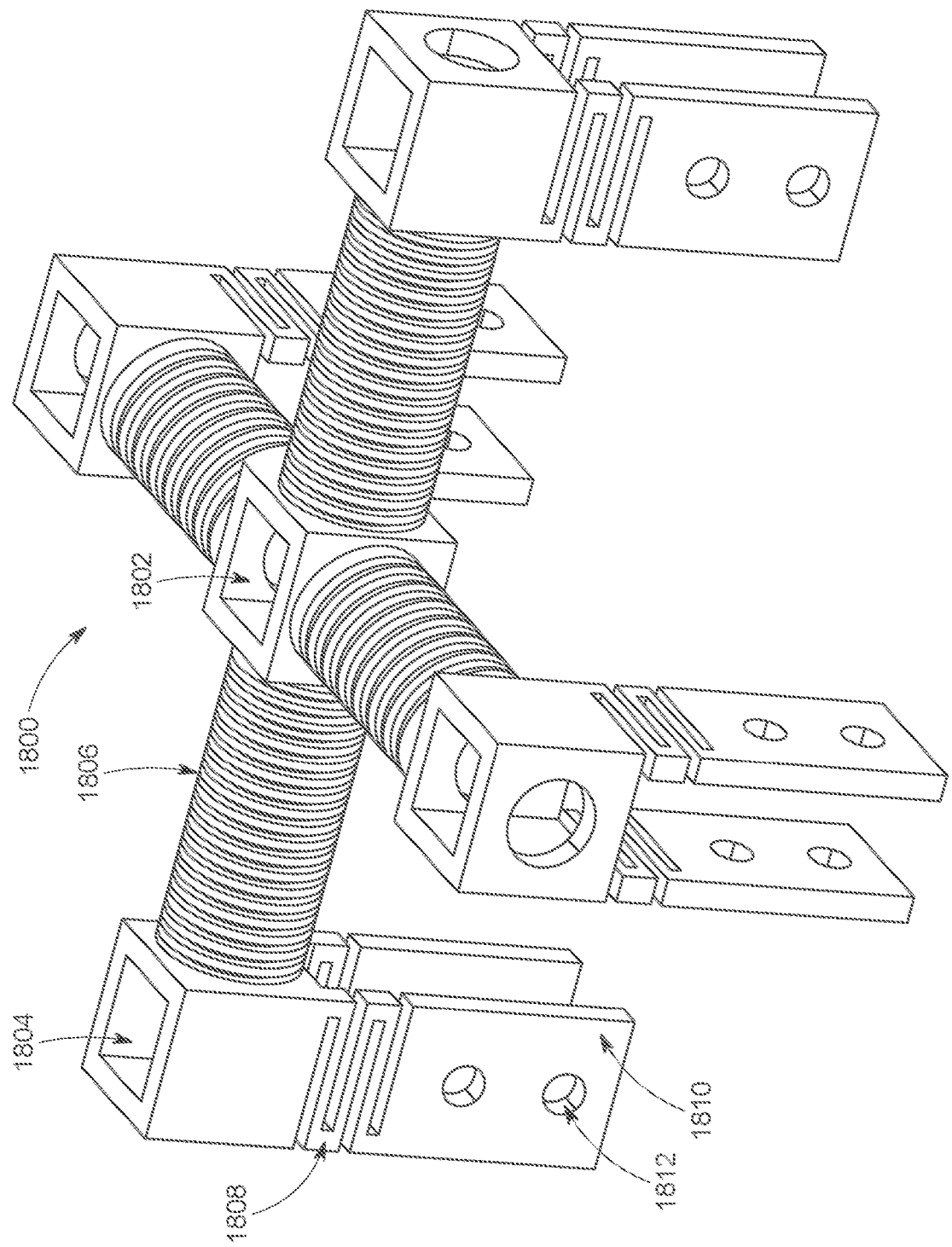
FIG. 18 shows an exemplary system, according to some embodiments.

FIG. 18 shows an exemplary connector 1800. Connector 1800 may have a central node 1802 and plurality of resilient members 1806. At an opposite end of each resilient member may be an outer node 1804, which may include a connecting structure 1810. Connector 1800 is shown with four resilient members 1806 and four outer nodes 1804, but any number of resilient members and outer nodes may be provided. In some embodiments, the connecting structure may be coupled to the node 1804 via a resilient coupling 1808. In some embodiments, the resilient coupling 1808 may be formed by cutting alternating grooves into the material of the node, as shown in FIG. 18. In some embodiments, resilient members 1806 may be formed in the same manner, using alternating grooves rather than a helical arrangement to promote flexibility. In some embodiments, the connecting structure 1810 may further include holes 1812, which may be configured to receive bolts or other fasteners.

This alternating groove arrangement can be used to form any of the resilient members described in the present disclosure. For example, any of the resilient members described in FIGS. 1-17 above can be formed by cutting one or more grooves in a metal or plastic piece of a desired shape. Resilient members having a circular cross-section, for example, can be formed by cutting a spiral groove in a cylindrical piece. Likewise, resilient members having triangular, rectangular, pentagonal, hexagonal, octagonal, etc. cross-sections can be formed by cutting spiral grooves in correspondingly shaped pieces. As used herein, the term "helical spring" does not impart any requirement on the cross-sectional shape of the spring. As shown in FIG. 18, alternating grooves can be cut in a solid piece (e.g., a sheet) to form a resilient member.

Figure 19:
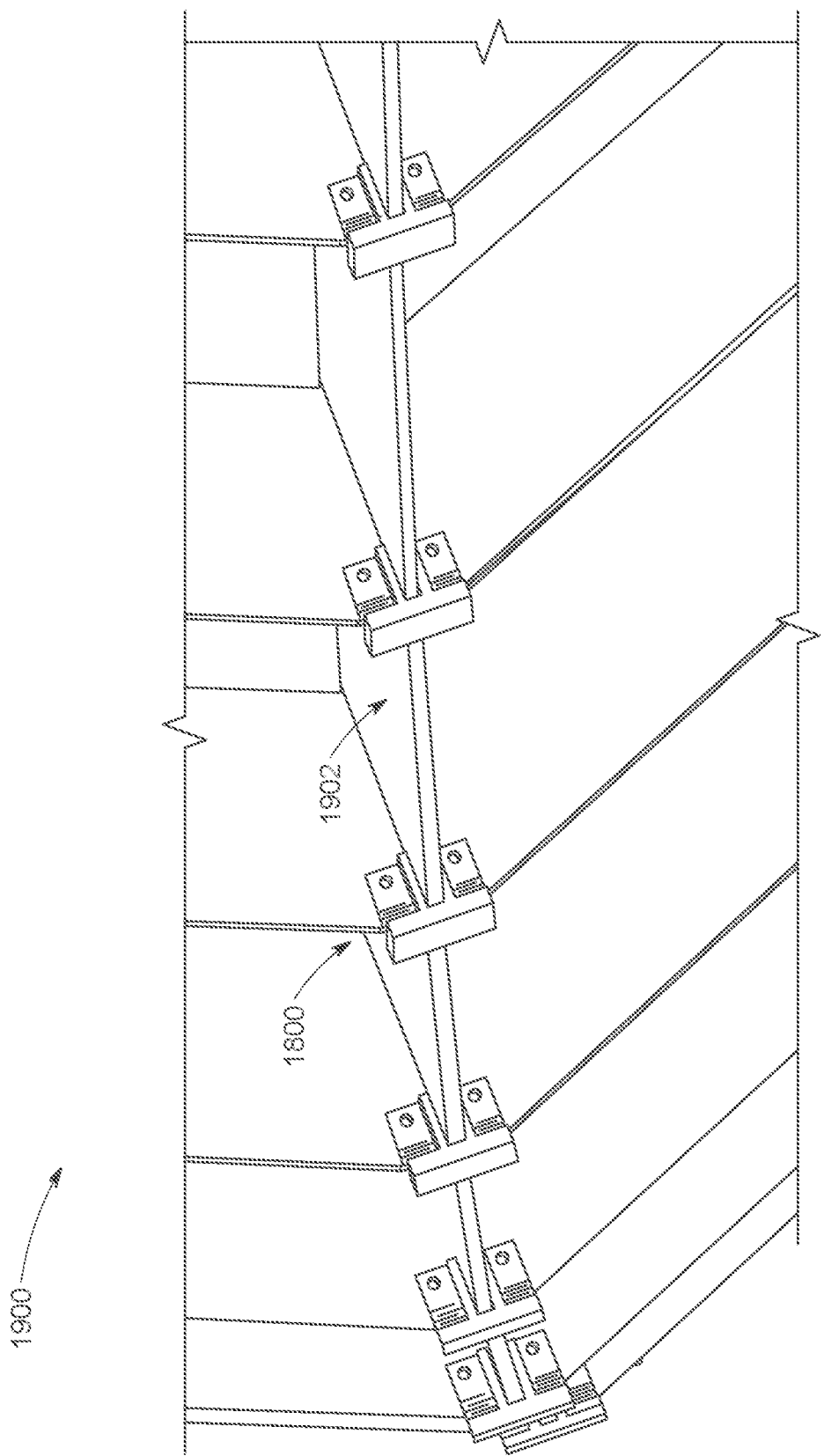
FIGS. 19-20 show exemplary structures that may be created using systems such as those shown in FIG. 18.
Figure 20:
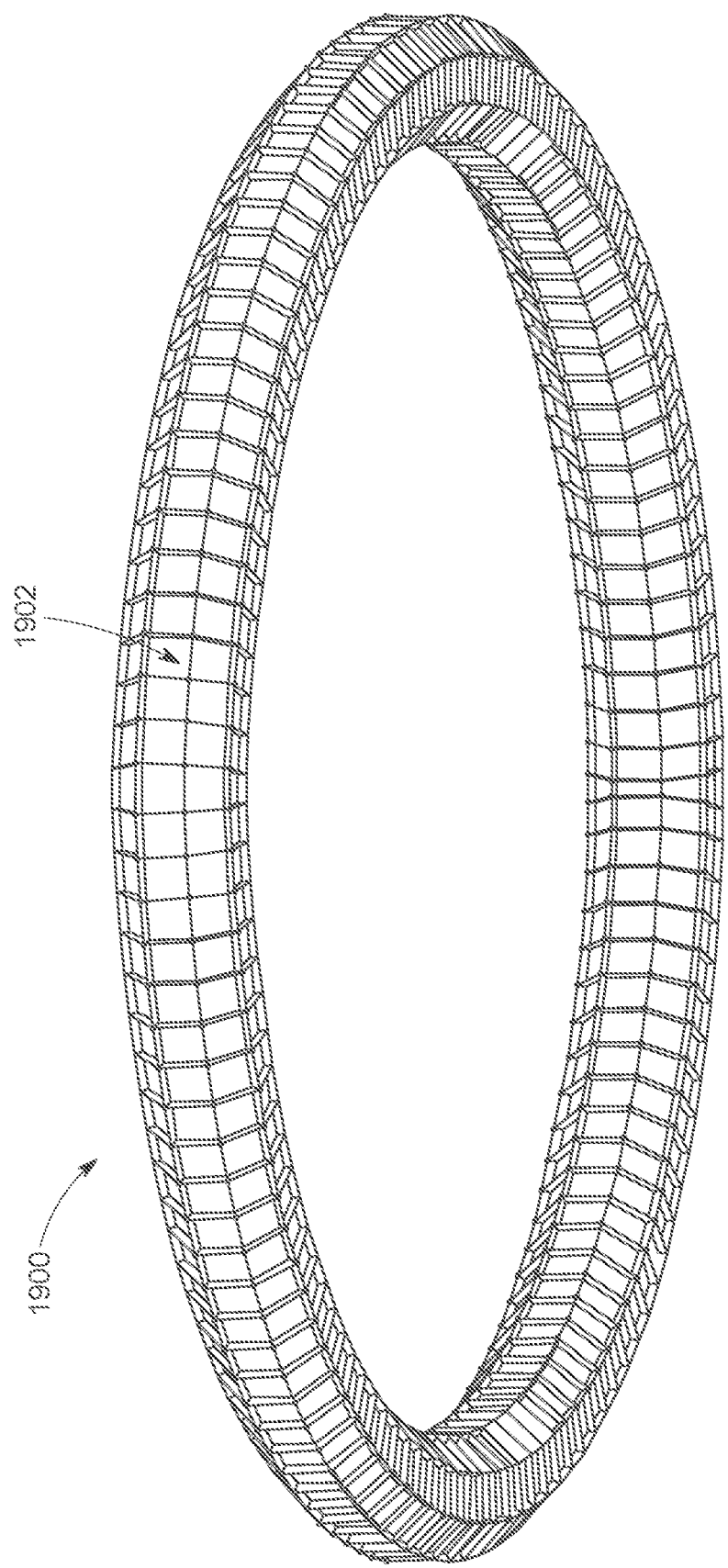

FIGS. 19 and 20 show exemplary structures that can be formed using connectors, such as connector 1800 showed in FIG. 18. For example, each connector 1800 may be used to connect a plurality of plates 1902. By connecting a series of plates in this manner, a structure, such as the toroid shown in FIG. 20, may be formed.

NUMBERED EMBODIMENTS

A1. A system, comprising:
a central node, the central node comprising a top portion, a bottom portion configured to removably couple with the top portion, and a plurality of holding portions; and
a plurality of hollow resilient members, wherein end portions of each hollow resilient member are configured to be received by one of the plurality of holding portions.

A2. The system of embodiment A1, wherein a central portion of each hollow resilient member has a smaller diameter than diameters of the end portions.

A3. The system of embodiment A1, further comprising at least one connector element configured to removably couple with one of the plurality of holding portions.

A4. The system of embodiment A1, wherein one of the plurality of hollow resilient members is received by threaded grooves of one of the plurality of holding portions.

B1. A system, comprising:
a central node comprising a plurality of holding portions;
a plurality of connector elements, wherein each connector element comprises:
a first solid end portion configured to removably couple with one of the plurality of holding portions;
a second solid end portion configured to removably couple one of the plurality of holding portions; and
a resilient portion comprising a helical spring between the first solid end portion and the second solid end portion.

B2. The system of embodiment B1, wherein the first solid end portion and the second solid end portion are further configured to receive a second connector element, wherein the second connector element is not coupled to the central node.

B3. The system of embodiment B1, wherein the central node further comprises an electronic module.

B4. The system of embodiment B3, further comprising an electronic device, comprising a first end portion configured to removably couple with one of the plurality of holding portions and communicably couple the electronic device with the electronic module.

C1. A modular system, comprising:
a central node comprising at least one holding portion;
a plurality of connector elements extending from the central node, wherein each connector element comprises:
a first end portion affixed to the central node;
a second end portion configured to couple with a second end portion of another modular system; and
a resilient portion comprising a helical spring between the first solid end portion and the second solid end portion; and
a plurality of cables affixed along an exterior of each of the plurality of connector elements.

C2. The system of embodiment C1, wherein the at least one holding portion is along a first axis of the central node and wherein the plurality of connector elements extend along a second axis of the central node, the second axis being perpendicular to the first axis.

C3. The system of embodiment C1, wherein the hollow resilient portion has a smaller diameter than a diameter of the first end portion and a diameter of the second end portion.

C4. The system of embodiment C1, wherein the central node further comprises an electronic module and an actuator.

C5. The system of embodiment C4, wherein the plurality of cables are coupled to the actuator.

D1. A system, comprising:
a plurality of central nodes, wherein each central node comprises a plurality of holding portions and is communicably coupled to at least one other central node in the plurality of central nodes, wherein one or more central nodes are associated with an electronic identifier;
a plurality of resilient members, wherein end portions of each resilient member of the plurality of resilient members are configured to be received within one of the plurality of holding portions; and
a plurality of connector elements, wherein each of the connector elements comprises two end portions, each end portion configured to removably couple with an end portion of one of the plurality of resilient members.

D2. The system of embodiment D1, wherein the second end of each resilient member couples with one of the plurality of connector elements via male and female connectors.

D3. The system of embodiment D1, wherein each central node further comprises a transparent material extending from the central node to the first end of each resilient member received by the central node.

D4. The system of embodiment D1, wherein each central node first comprises a first portion and a second portion, wherein the first portion is configured to achieve a snap fit with the second portion, and wherein each of the plurality of resilient members are configured to be received within the central node when the first portion and the second portion are uncoupled.

D5. The system of embodiment D1, wherein the resilient member comprises a spring.

D6. The system of embodiment D1, wherein the resilient member is configured in an hourglass shape.

D7. The system of embodiment D6, wherein an actuator at each central node is further configured to control movement of each of the plurality of resilient members received by the central node.

D8. The system of embodiment D7, wherein controlling movement further comprises adjusting at least one of: a tension of a resilient member, a position of a resilient member, an orientation of a resilient member, and any combination thereof.

D9. The system of embodiment D7, wherein each of the plurality of resilient members further comprises a exterior portion, wherein the exterior portion further comprises at least one cable extending from the first end to the second end of the resilient member.

D10. The system of embodiment D7, wherein the actuator is further configured to control movement of the resilient member by exerting force on the at least one cable.

D11. The system of embodiment D6, further comprising a hinge joint at an intersection of each resilient member and a corresponding central node.

D12. The system of embodiment D6, further comprising an electronic module communicatively coupled to each actuator at each central node, wherein the electronic module comprises at least one of: a communication element, a processor, and a memory module.

D13. The system of embodiment D12, wherein each of the plurality of resilient members and each of the plurality of connector elements further comprise a hollow portion, and wherein the electronic module is communicatively coupled to at least one actuator via wired connections through the hollow portion at each of the plurality of resilient members and each of the plurality of connector elements.

D14. The system of embodiment D12, wherein the processor controls movement of the one or more resilient members based on instructions received from an external computing device via the communication element.

D15. The system of embodiment D12, wherein the plurality of central nodes, the plurality resilient members, and the plurality of connector elements form a compact position upon instruction from the processor.

D16. The system of embodiment D12, wherein the plurality of central nodes, the plurality resilient members, and the plurality of connector elements form a three-dimensional shape upon instruction from the processor.

D17. The system of embodiment D7, wherein each end portion of the connector elements further comprises:
  a second actuator; and
  a protruding wheel configured to receive instructions from the second actuator and to adjust the second end of a resilient member based on the received instructions.

D18. The system of embodiment D7, wherein each of the plurality of resilient members and each of the plurality of connector elements further comprise at least one positional sensor communicatively coupled to an actuator at a corresponding central node.

D19. The system of embodiment D1, wherein each of the plurality of central nodes further comprises a valve configured to release a gas or a liquid when the valve is in an open position.

E1. A system, comprising:
  a plurality of central nodes, wherein each central node comprises a plurality of holding portions and at least two sections, wherein each section of the at least two sections removably couples with remaining sections of the at least two sections;
  a plurality of hollow resilient members, wherein a first end of each hollow resilient member is configured to be received within one of the plurality of holding portions of a central node when the at least two sections are uncoupled and configured to be secured in a received position within the central node when the at least two sections are coupled; and
  a plurality of connector elements, wherein each of the connector elements comprises two end portions, wherein each end portion removably couples with a second end of one of the plurality of resilient members.

While various examples of the present invention have been described above, it should be understood that they have been presented by way of example only, and not limitation. Numerous changes to the disclosed examples can be made in accordance with the disclosure herein without departing from the spirit or scope of the invention. Thus, the breadth and scope of the present invention should not be limited by any of the above described examples. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular examples only and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

The invention claimed is:

1. A modular system, comprising:
  a central node comprising a plurality of holding portions;
  a plurality of connector elements configured to extend from the central node, wherein each of the plurality of connector elements includes:
    a first end portion having a first engagement structure that is shaped and sized to be coupled to a holding portion of the plurality of holding portions of the central node;
    a second end portion having a second engagement structure that is shaped and sized to be coupled to a corresponding holding portion of a different central node; and,
    a resilient portion being disposed between the first end portion and the second end portion; and,
  an electronic identifier associated with the central node, the electronic identifier configured to communicate with the different central node or another central node of a multi-mode system.

2. The system of claim 1, wherein the first end portion, the second end portion, and the resilient portion are formed as a single unitary piece.

3. The system of claim 1, wherein at least one of the plurality of holding portions is along a first axis of the central node and wherein the plurality of connector elements extend along a second axis of the central node, the second axis being perpendicular to the first axis.

4. The system of claim 1, further including a plurality of cables affixed along an exterior of each of the plurality of connector elements.

5. The system of claim 4, wherein the central node further comprises an electronic module and an actuator.

6. The system of claim 5, wherein the plurality of cables are coupled to the actuator.

7. The system of claim 1, wherein the first engagement structure is configured to snap fit with the holding portion of the plurality of holding portions of the central node.

8. The system of claim 1, wherein the first engagement structure is configured to be bolted or pinned to the holding portion of the plurality of holding portions of the central node.

9. The system of claim 1, further comprising an electronic device, the electronic device including a first end portion configured to removably couple with one of the plurality of holding portions.

10. The system of claim 1, wherein the central node is communicable coupled to the different central node or the another central node.

11. The system of claim 1, wherein the central node includes an actuator, the actuator configured to control a movement of each of the plurality of connector elements extending from the central node.

12. The system of claim 11, wherein the actuator is configured to control the movement of each of the plurality of connector elements extending from the central node by adjusting at least one of: a tension of the connector element, a position of the connector element, an orientation of the connector element, and any combination thereof.

13. The system of claim 2, wherein the central node includes an electronic module communicatively coupled to the actuator, wherein the electronic module includes at least one of: a communication element, a processor, and a memory module.

14. The system of claim 13, wherein each of the plurality of connector elements includes a hollow portion, and further wherein the electronic module is communicatively coupled to the actuator via a wired connection extending through the hollow portion.

15. The system of claim 14, wherein the processor is configured to control movement of the plurality of connector elements based on instructions received from an external computing device via the communication element.

16. The system of claim 15, wherein the central node and the plurality of connector elements form a three-dimensional shape upon instruction from the processor.

17. The system of claim 1, wherein the central node further includes an actuator, and further including at least one positional sensor communicatively coupled to the actuator or the connector element.

18. The system of claim 1, wherein the resilient portion comprises a helical spring or a structure containing alternating grooves.

19. The system of claim 1, wherein the central node is a first central node and the plurality of connector elements are a first plurality of connector elements, and further including:
a second central node comprising a second plurality of connector elements, wherein the second end portion having the second engagement structure is configured to couple to a corresponding second engagement structure of the first plurality of connector elements.

20. The system of claim 19, wherein the second engagement structure is configured to snap fit with the corresponding second engagement structure of the first plurality of connector elements.

21. The system of claim 19, wherein the second engagement structure is configured to be bolted or pinned to the corresponding second engagement structure of the first plurality of connector elements.

* * * * *